US008483886B2

(12) United States Patent
Onnerud et al.

(10) Patent No.: US 8,483,886 B2
(45) Date of Patent: Jul. 9, 2013

(54) LARGE SCALE BATTERY SYSTEMS AND METHOD OF ASSEMBLY

(75) Inventors: Per Onnerud, Framingham, MA (US); Jan-Roger Linna, Boston, MA (US); John Warner, Shrewsbury, MA (US); Chad Souza, North Providence, RI (US); Eckart Jansen, Belmont, MA (US)

(73) Assignee: Boston-Power, Inc., Westborough, MA (US)

( * ) Notice: Subject to any disclaimer, the term of this patent is extended or adjusted under 35 U.S.C. 154(b) by 463 days.

(21) Appl. No.: 12/872,651

(22) Filed: Aug. 31, 2010

(65) Prior Publication Data

US 2011/0213509 A1    Sep. 1, 2011

Related U.S. Application Data

(60) Provisional application No. 61/238,882, filed on Sep. 1, 2009.

(51) Int. Cl.
*G06F 1/26*    (2006.01)
*H01M 10/00*    (2006.01)

(52) U.S. Cl.
USPC .................... 700/297; 429/156; 29/623.1

(58) Field of Classification Search
USPC ............ 700/297; 429/61, 62, 94, 156, 223, 429/224, 231.1, 231.95; 340/636.1; 320/116, 320/118, 119, 132, 134, 136, 150, 152; 307/9.1; 29/623.1; D13/103; 105/50
See application file for complete search history.

(56) References Cited

U.S. PATENT DOCUMENTS

| | | | |
|---|---|---|---|
| 3,665,285 A | 5/1972 | Mullersman et al. | |
| 4,280,578 A | 7/1981 | Perkins | |
| 4,553,081 A | 11/1985 | Koenck | |
| 4,670,703 A | 6/1987 | Williams | |
| 5,045,085 A * | 9/1991 | Binder et al. ............... | 29/623.1 |
| 5,254,931 A | 10/1993 | Martensson | |
| 5,325,040 A | 6/1994 | Bogut et al. | |
| 5,420,496 A | 5/1995 | Ishikawa | |
| 5,471,128 A | 11/1995 | Patino et al. | |
| 5,493,199 A | 2/1996 | Koenck et al. | |

(Continued)

FOREIGN PATENT DOCUMENTS

| | | |
|---|---|---|
| CN | 1700498 | 11/2005 |
| EP | 0 450 783 A2 | 10/1991 |
| EP | 0 450 783 A3 | 10/1991 |
| EP | 0 762 521 A2 | 3/1997 |
| EP | 0 762 521 A3 | 5/1997 |

(Continued)

OTHER PUBLICATIONS

Unpublished U.S. Appl. 12/906,676, filed Oct. 18, 2010 to Partin et al.

(Continued)

*Primary Examiner* — Dave Robertson
(74) *Attorney, Agent, or Firm* — Hamilton, Brook, Smith & Reynolds, P.C.

(57) ABSTRACT

The methods in this disclosure allow for the identification, selection, and arrangement of cells, blocks, and modules in large scale battery systems, such as electric vehicle battery systems. An example embodiment of the present invention allows for the identification of the cells, blocks, and modules with a unique identifier or associated parameter (e.g., internal resistance contributions or capacity). Additionally, to form a block, cells may be selected from a group of capacity-range sorting bins. Based on a parameter of the cell, a pseudo-number generator may be also be used to select cells from an available inventory of cells as maintained in a cell database based. Cells may also be placed in a block for uniform effective cell impedance and even cell aging while minimizing overall block capacity degradation caused by cycling. Block capacities may also be computed based on a known average temperature gradient during operation.

33 Claims, 14 Drawing Sheets

U.S. PATENT DOCUMENTS

| | | | |
|---|---|---|---|
| 5,504,415 A | 4/1996 | Podrazhansky et al. | |
| 5,506,490 A | 4/1996 | DeMuro | |
| 5,510,693 A | 4/1996 | Theobald | |
| 5,565,756 A | 10/1996 | Urbish et al. | |
| 5,567,539 A | 10/1996 | Takahashi et al. | |
| 5,606,242 A * | 2/1997 | Hull et al. | 320/106 |
| 5,608,305 A | 3/1997 | Kokuga | |
| 5,617,010 A | 4/1997 | Higashijima et al. | |
| 5,677,083 A | 10/1997 | Tomiyama | |
| 5,677,944 A | 10/1997 | Yamamoto et al. | |
| 5,683,634 A | 11/1997 | Fujii et al. | |
| 5,694,021 A | 12/1997 | Morioka et al. | |
| 5,714,866 A | 2/1998 | S et al. | |
| 5,773,962 A | 6/1998 | Nor | |
| 5,789,902 A | 8/1998 | Abe et al. | |
| 5,879,834 A | 3/1999 | Mao | |
| 5,883,498 A | 3/1999 | Van Beek et al. | |
| 5,903,131 A | 5/1999 | Sekine et al. | |
| 5,920,180 A | 7/1999 | Kim | |
| 5,939,864 A | 8/1999 | Lenhart et al. | |
| 5,955,797 A | 9/1999 | Kim | |
| 5,986,433 A | 11/1999 | Peele et al. | |
| 5,993,998 A | 11/1999 | Yasuda | |
| 6,008,627 A | 12/1999 | Narita | |
| 6,033,797 A | 3/2000 | Mao et al. | |
| 6,074,523 A | 6/2000 | Mizobuchi et al. | |
| 6,114,835 A | 9/2000 | Price | |
| 6,114,836 A | 9/2000 | Hagiwara et al. | |
| 6,133,709 A | 10/2000 | Puchianu | |
| 6,159,636 A | 12/2000 | Wang et al. | |
| 6,166,522 A | 12/2000 | Patino et al. | |
| 6,184,656 B1 | 2/2001 | Karunasiri et al. | |
| 6,218,806 B1 | 4/2001 | Brotto et al. | |
| 6,239,579 B1 | 5/2001 | Dunn et al. | |
| 6,265,107 B1 | 7/2001 | Shimizu et al. | |
| 6,267,943 B1 | 7/2001 | Manev et al. | |
| 6,275,497 B1 | 8/2001 | Varma et al. | |
| 6,291,973 B1 | 9/2001 | Lee | |
| 6,333,128 B1 | 12/2001 | Sunagawa et al. | |
| 6,342,774 B1 | 1/2002 | Kreisinger et al. | |
| 6,395,426 B1 | 5/2002 | Imachi et al. | |
| 6,462,513 B1 | 10/2002 | Bradus et al. | |
| 6,482,550 B1 | 11/2002 | Imachi et al. | |
| 6,486,637 B1 * | 11/2002 | Nakanishi et al. | 320/150 |
| 6,521,379 B2 | 2/2003 | Nishida et al. | |
| 6,534,216 B1 | 3/2003 | Narukawa et al. | |
| 6,551,744 B1 | 4/2003 | Ohzuku et al. | |
| 6,582,854 B1 | 6/2003 | Qi et al. | |
| 6,653,021 B2 | 11/2003 | Kweon et al. | |
| 6,677,080 B2 | 1/2004 | Tanizaki et al. | |
| 6,677,082 B2 | 1/2004 | Thackeray et al. | |
| 6,682,850 B1 | 1/2004 | Numata et al. | |
| 6,700,350 B2 | 3/2004 | Formenti et al. | |
| 6,746,800 B1 | 6/2004 | Sunagawa et al. | |
| 6,808,848 B2 | 10/2004 | Nakanishi et al. | |
| 6,818,351 B2 | 11/2004 | Sunagawa et al. | |
| 6,882,129 B2 * | 4/2005 | Boskovitch et al. | 320/119 |
| 7,014,954 B2 | 3/2006 | Yamaguchi et al. | |
| 7,034,506 B2 | 4/2006 | Chen et al. | |
| 7,138,207 B2 | 11/2006 | Yamaguchi et al. | |
| 7,193,392 B2 * | 3/2007 | King et al. | 320/118 |
| 7,198,871 B2 | 4/2007 | Kitao et al. | |
| 7,258,948 B2 | 8/2007 | Miyamoto et al. | |
| 7,309,546 B2 | 12/2007 | Kweon et al. | |
| 7,338,734 B2 | 3/2008 | Chiang et al. | |
| 7,339,353 B1 | 3/2008 | Masias et al. | |
| 7,402,360 B2 | 7/2008 | Imachi et al. | |
| 7,560,899 B1 | 7/2009 | Potanin et al. | |
| 7,656,125 B2 | 2/2010 | Lampe-Onnerud et al. | |
| 7,661,370 B2 * | 2/2010 | Pike et al. | 105/50 |
| 7,692,407 B2 | 4/2010 | Nozawa | |
| 7,825,615 B2 | 11/2010 | Partin et al. | |
| 7,985,495 B2 * | 7/2011 | Okada et al. | 429/9 |
| 8,084,998 B2 | 12/2011 | Lampe-Onnerud et al. | |
| 8,087,798 B2 * | 1/2012 | Mazzochette | 362/231 |
| 8,339,100 B2 * | 12/2012 | Li et al. | 320/118 |
| 2001/0020927 A1 | 9/2001 | Ikawa et al. | |
| 2001/0026147 A1 | 10/2001 | Nakashimo | |
| 2002/0001745 A1 | 1/2002 | Gartstein et al. | |
| 2002/0004169 A1 | 1/2002 | Yamada et al. | |
| 2002/0012841 A1 | 1/2002 | Kurose et al. | |
| 2002/0061443 A1 | 5/2002 | Nakanishi et al. | |
| 2002/0089308 A1 | 7/2002 | Sakurai | |
| 2002/0090546 A1 | 7/2002 | Mu-Tsai et al. | |
| 2002/0189831 A1 | 12/2002 | Carrier | |
| 2003/0054251 A1 | 3/2003 | Ohzuku et al. | |
| 2003/0073002 A1 | 4/2003 | Imachi et al. | |
| 2003/0087154 A1 | 5/2003 | Ohzuku et al. | |
| 2003/0138699 A1 | 7/2003 | Kweon et al. | |
| 2003/0148183 A1 | 8/2003 | Yamasaki | |
| 2003/0170540 A1 | 9/2003 | Ohzuku et al. | |
| 2003/0180615 A1 | 9/2003 | Johnson et al. | |
| 2003/0180616 A1 | 9/2003 | Johnson et al. | |
| 2004/0058243 A1 | 3/2004 | Ohzuku et al. | |
| 2004/0066171 A1 | 4/2004 | Mori | |
| 2004/0081888 A1 | 4/2004 | Thackeray et al. | |
| 2004/0096743 A1 | 5/2004 | Okae et al. | |
| 2004/0126660 A1 | 7/2004 | Ohzuku et al. | |
| 2004/0197650 A1 | 10/2004 | Kubota et al. | |
| 2004/0197654 A1 | 10/2004 | Barker et al. | |
| 2004/0202933 A1 | 10/2004 | Yamaki et al. | |
| 2005/0007798 A1 | 1/2005 | Chen | |
| 2005/0026040 A1 | 2/2005 | Thackeray et al. | |
| 2005/0079416 A1 | 4/2005 | Ohzuku et al. | |
| 2005/0142442 A1 | 6/2005 | Yuasa et al. | |
| 2005/0147889 A1 | 7/2005 | Ohzuku et al. | |
| 2005/0170250 A1 | 8/2005 | Ohzuku et al. | |
| 2005/0186474 A1 | 8/2005 | Jiang et al. | |
| 2006/0035151 A1 | 2/2006 | Kumeuchi et al. | |
| 2006/0063073 A1 | 3/2006 | Kawashima et al. | |
| 2006/0222936 A1 | 10/2006 | Yamaguchi et al. | |
| 2007/0013347 A1 | 1/2007 | Kamohara | |
| 2007/0026315 A1 | 2/2007 | Lampe-Onnerud et al. | |
| 2007/0082265 A1 | 4/2007 | Itou et al. | |
| 2007/0111098 A1 | 5/2007 | Yang Kook et al. | |
| 2007/0120531 A1 | 5/2007 | Huh | |
| 2007/0180687 A1 * | 8/2007 | Dixon et al. | 29/623.1 |
| 2007/0298314 A1 | 12/2007 | Partin et al. | |
| 2008/0008933 A1 | 1/2008 | Lampe-Onnerud | |
| 2008/0048614 A1 | 2/2008 | Partin et al. | |
| 2008/0197812 A1 | 8/2008 | Maireanu et al. | |
| 2009/0009176 A1 | 1/2009 | Nakao | |
| 2009/0029193 A1 | 1/2009 | Onnerud et al. | |
| 2010/0047684 A1 * | 2/2010 | Okumura et al. | 429/156 |
| 2010/0108291 A1 | 5/2010 | Onnerud et al. | |
| 2010/0121511 A1 | 5/2010 | Onnerud et al. | |
| 2010/0164436 A1 | 7/2010 | Lampe-Onnerud et al. | |
| 2010/0289457 A1 | 11/2010 | Onnerud et al. | |
| 2011/0049977 A1 | 3/2011 | Onnerud et al. | |
| 2011/0115434 A1 | 5/2011 | Partin et al. | |
| 2011/0295533 A1 * | 12/2011 | Porcellato | 702/63 |
| 2012/0068715 A1 * | 3/2012 | Martaeng | 324/434 |
| 2012/0153872 A1 * | 6/2012 | An | 315/312 |

FOREIGN PATENT DOCUMENTS

| | | |
|---|---|---|
| EP | 0 932 240 A2 | 7/1999 |
| EP | 0 932 240 A3 | 7/1999 |
| EP | 0 949 702 A1 | 10/1999 |
| EP | 0 973 217 A2 | 1/2000 |
| EP | 0 997 957 A1 | 5/2000 |
| EP | 0 999 604 A1 | 5/2000 |
| EP | 1 022 792 A1 | 7/2000 |
| EP | 1 100 133 A2 | 5/2001 |
| EP | 0 997 957 B1 | 8/2001 |
| EP | 1 237 213 A2 | 9/2002 |
| EP | 1 296 391 A1 | 3/2003 |
| EP | 1 309 022 A2 | 5/2003 |
| EP | 1 309 022 A3 | 5/2003 |
| EP | 0 949 702 B1 | 8/2003 |
| EP | 1 383 183 A1 | 1/2004 |
| EP | 1 487 039 A1 | 12/2004 |
| EP | 1 538 686 A1 | 6/2005 |
| EP | 1 237 213 A3 | 11/2005 |
| JP | 5082131 A | 4/1993 |
| JP | 2008-103029 | 4/1996 |
| JP | 08-221157 A | 8/1996 |
| JP | 2000-012030 A | 1/2000 |
| JP | 2000-323186 A | 11/2000 |
| JP | 2001-128389 A | 5/2001 |
| JP | 2001-195353 A | 7/2001 |

| | | | |
|---|---|---|---|
| JP | 2001-243943 A | 9/2001 | |
| JP | 2001-319647 A | 11/2001 | |
| JP | 2001328818 A | 11/2001 | |
| JP | 2002-042815 A | 2/2002 | |
| JP | 2002-075369 A | 3/2002 | |
| JP | 2002216745 A | 8/2002 | |
| JP | 2002251996 A | 9/2002 | |
| JP | 2003-079067 | 3/2003 | |
| JP | 2003169424 A | 6/2003 | |
| JP | 2003-197180 A | 7/2003 | |
| JP | 2004-006094 A | 1/2004 | |
| JP | 2005 073434 A | 3/2005 | |
| JP | 2007-118680 | 5/2007 | |
| JP | 2007-149561 | 6/2007 | |
| JP | 2007-157631 | 6/2007 | |
| JP | 2007-318855 A | 12/2007 | |
| KR | 10-20080081446 A | 9/2008 | |
| KR | 10-2008-0091392 | 10/2008 | |
| KR | 10-2009-0052897 | 5/2009 | |
| WO | WO 93/19508 A1 | 9/1993 | |
| WO | WO 98/24131 A | 6/1998 | |
| WO | WO 99/53556 A1 | 10/1999 | |
| WO | WO 02/078105 A1 | 10/2002 | |
| WO | WO 03/026047 | 3/2003 | |
| WO | WO 03/075376 A1 | 9/2003 | |
| WO | WO 03/092099 A1 | 11/2003 | |
| WO | WO 2004/019433 A1 | 3/2004 | |
| WO | WO 2004/097964 A2 | 11/2004 | |
| WO | WO 2004/097964 A3 | 11/2004 | |
| WO | WO 2004/105162 A1 | 12/2004 | |
| WO | WO 2005/031892 A2 | 4/2005 | |
| WO | WO 2006/056744 A1 | 6/2006 | |
| WO | WO 2006/071972 A2 | 7/2006 | |
| WO | WO 2006/071972 A3 | 7/2006 | |
| WO | WO 2007/011661 A1 | 1/2007 | |
| WO | WO 2007/149102 A1 | 12/2007 | |
| WO | WO 2008/002486 A2 | 1/2008 | |
| WO | WO 2008/002487 A2 | 1/2008 | |
| WO | WO 2008/002607 A2 | 1/2008 | |
| WO | WO 2009/002438 A1 | 12/2008 | |
| WO | WO 2010/030875 A1 | 3/2010 | |
| WO | WO 2010/042517 A1 | 4/2010 | |
| WO | WO 2010/135260 A2 | 11/2010 | |

OTHER PUBLICATIONS

Unpublished U.S. Appl. 12/872,494, filed Aug. 31, 2010 to Onnerud et al.
Final Office Action for U.S. Appl. 12/651,024; Date Mailed: Nov. 24, 2010.
Non-Final Office Action for U.S. Appl. 11/823,479; Date Mailed: Jan. 6, 2010.
Amendment in Response to Jan. 6, 2010 Office Action for U.S. Appl. 11/823,479; Date Filed: Jun. 4, 2010.
Notice of Allowance and Fee(s) Due for U.S. Appl. 11/823,479; Date Mailed: Jul. 16, 2010.
Notification of Transmittal of the International Search Report and the Written Opinion of the International Searching Authority for Int'l Application No. PCT/US2006/027245; Date Mailed: Oct. 25, 2006.
Amendment Under Article 34 and Reply to Written Opinion for Int'l Application No. PCT/US2006/027245; Date Filed: May 10, 2007.
Notification of Transmittal of the International Preliminary Report on Patentability for Int'l Application No. PCT/US2006/027245; Date Mailed: Nov. 16, 2007.
Notification of Transmittal of the International Search Report and the Written Opinion of the International Searching Authority for Int'l Application No. PCT/US2007/014905; Date Mailed: Dec. 27, 2007.
Notification Concerning Transmittal of International Preliminary Report on Patentability for Int'l Application No. PCT/US2007/014905; Date Mailed: Jan. 15, 2009.
Notification of Transmittal of the International Search Report and Written Opinion of the International Searching Authority for Int'l Application No. PCT/US2009/059696, Date Mailed: Feb. 4, 2010.
Amendment Under Article 34 and Reply to Written Opinion for Int'l Application No. PCT/US2009/059696; Date Filed: Aug. 6, 2010.
Notification of Transmittal of the International Preliminary Report on Patentability for Int'l Application No. PCT/US2009/059696; Date Mailed: Sep. 6, 2010.
Notification of Transmittal of the International Search Report and the Written Opinion of the International Searching Authority for Int'l Application No. PCT/US2009/056656, Date Mailed: Dec. 18, 2009.
Amendment Under Article 34 and Reply to Written Opinion for Int'l Application No. PCT/US2009/056656, Date Filed: Jul. 9, 2010.
Notification of Transmittal of the International Preliminary Report on Patentability for Int'l Application No. PCT/US2009/056656, Date Mailed: Dec. 17, 2010.
Notification of Transmittal of the International Search Report and the Written Opinion of the International Searching Authority for Int'l Application No. PCT/US2010/035154; Date Mailed: Dec. 27, 2010.
Deng, B. et al., "Greatly improved elevated-temperature cycling behavior of Li1+xMgyMn2-x-yO4+δ spinels with controlled oxygen stiochiometry," Electrochimica Acta (49)11:1823-1830 (2004).
Ohzuku, T. et al., "Electrochemistry of Manganese Dioxide in Lithium Nonaqueous Cell," J. Electrochemical Society, (137)3:769-775 (Mar. 1, 1990).
Cho, J. et al., "Zero-Strain Intercalation Cathode for Rechargeable Li-Ion Cell," Angew.Chem. Int. Ed. (40)18:3367-3369 (2001) (Month not available).
Biancomano, V., EEProductCenter Gas Gauge Chipset Advances Li-ion Battery Protection [online] Dec. 2006 [retrieved on Jan. 17, 2007]. Retrieved form the internet <URL: http://www.eeproductcenter.com/showArticle.jhtml?articleID=196700961>.
Sony BP-GL95 Rechargeable Lithium-ion Battery Pack [online]. [retrieved on Jan. 17, 2007]. Retrieved from the internet: <URL: http://www.expandore.com/product/sony/Proav/model/accessories/BPGL95.htm>.
Aspen Nexus 50, 14.4 Volt, 50 WH Lithium Ion Battery W/4 Level Led Status Display [online].[retrieved on Jan. 17, 2007]. Retrieved from the internet: <URL: http://www.tristatecamera.com/lookat.php?sku—ASPNEXUS50&cs=find.php&action=search&target=products&keywords=Nexus%2050&search_method=all>.
NP-QM91D InfoLithium M Series Rechargeable Battery Back NP-QM91D [online]. Sony Corporation [retrieved on Jan. 17, 2007]. Retrieved from the internet: <URL: http://www.sonystyle.com/webapp/wcs/stores/servlet/ProductDisplay?catalogId=10551&storeId=10151&langId=-1&productId=11040750>.
Texas Instruments "bq20z8OEVM-001 SBS 1.1 Impedance Track Technology Enabled Battery Management Solution Evaluation Module". Oct. 2004—Revised May 2005.
Texas Instruments "SBS 1.1 Compliant Gas Gauge Enabled with Impedance Track Technology for use with bq29330". Dec. 2005—Revised Jun. 2006.
Texas Instruments "SBS v1.1 Compliant Gas Gauge for use with bq29312". Jul. 2005—Revised Aug. 2006.
Japanese Office Action from Japanese Patent Application No. 2009-518246.
Non-Final Office Action for U.S. Appl. 12/906,676; Date Mailed: Mar. 7, 2011.
Non-Final Office Action for U.S. Appl. 12/906,676; Date Mailed: Jul. 11, 2011.
Notification of Transmittal of the International Search Report and the Written Opinion of the International Searching Authority, or the Declaration from PCT/US2010/047315, date of mailing May 13, 2011.
Notification of Transmittal of the International Search Report and the Written Opinion of the International Searching Authority, or the Declaration from PCT/US2010/047285, date of mailing Apr. 14, 2011.
SBS 1.1—Compliant Gas Gauge and Protection Enabled With Impedance TrackTexas Instruments; Production Data Dated: Dec. 2009, Texas Instruments, 20 pages.
Japanese Office Action for Patent Application 2009-518246, dated Nov. 15, 2012, consisting of 2 pages.

* cited by examiner

| Module ID | Cycle | Module Capacity (Wh) | Block 1 Capacity (Wh) | Block 2 Capacity (Wh) | Block 3 Capacity (Wh) | Block 4 Capacity (Wh) | Block 5 Capacity (Wh) | Block 6 Capacity (Wh) | T1 avg (deg C) | T2 avg (deg C) |
|---|---|---|---|---|---|---|---|---|---|---|
| 46034 | 1 | 546.96 | 90.95 | 91.19 | 91.24 | 91.28 | 91.24 | 91.07 | 30.1 | 30.0 |
|  | 25 | 540.66 | 89.90 | 90.13 | 90.18 | 90.23 | 90.20 | 90.03 | 30.2 | 30.5 |
|  | 50 | 537.67 | 89.43 | 89.64 | 89.67 | 89.72 | 89.69 | 89.53 | 30.4 | 30.7 |

T1 = temp between blocks 1 and 2    T2 = temp between blocks 5 and 6

FIG. 7A

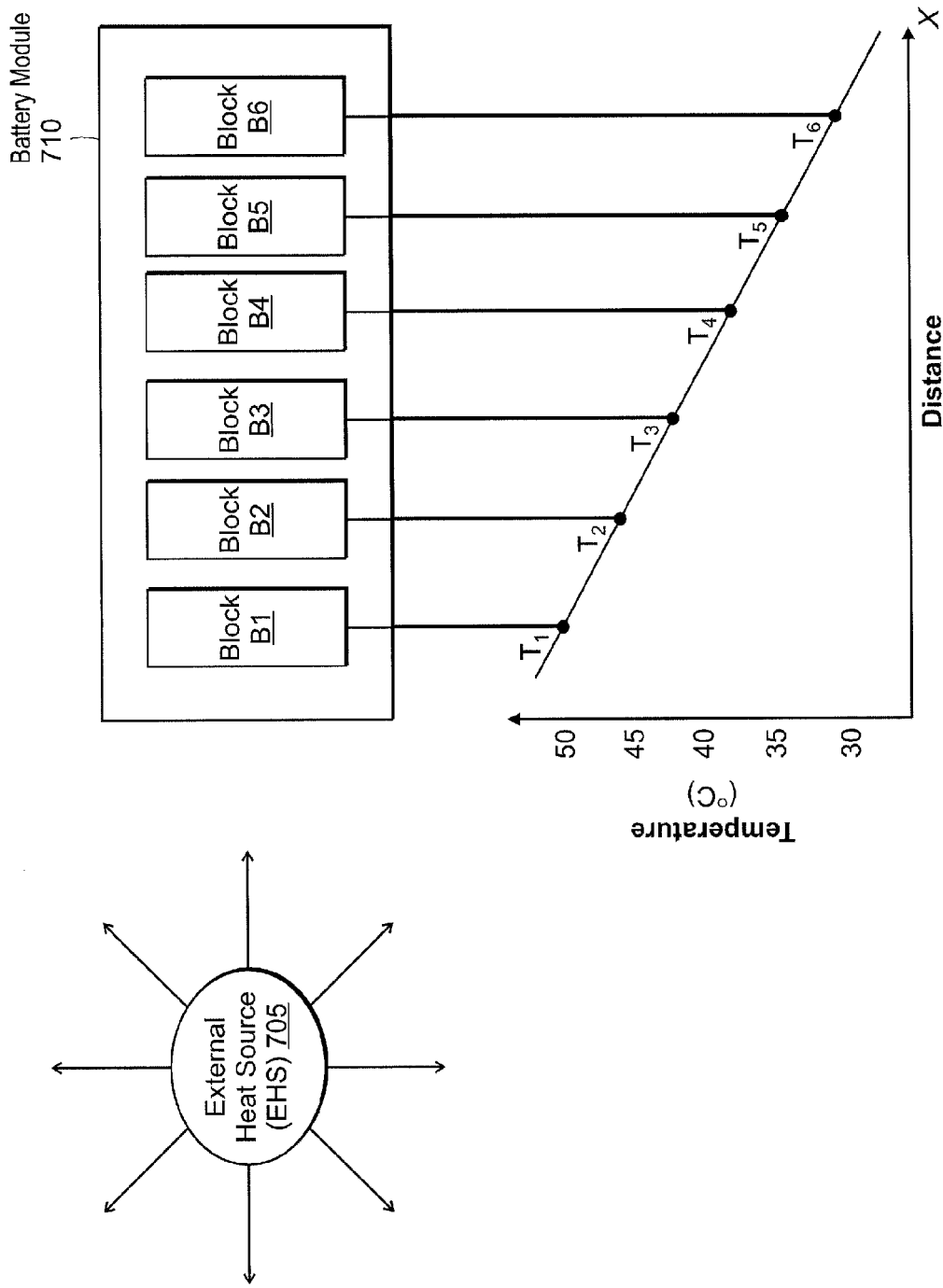

| Module | Block | Cell | IR | OCV | CAP | BIN | Tote Date |
|---|---|---|---|---|---|---|---|
| 46033 | 00S08PU110046031 | | 2.64 | 3.758 | | | |
| | | SA3310909142029 | 17.00 | 3.7853 | 4462.0 | E | 10/23/2009 |
| | | SA3310909140853 | 17.40 | 3.7857 | 4469.2 | E | 10/23/2009 |
| | | SA3310909145082 | 17.70 | 3.7853 | 4459.0 | E | 10/23/2009 |
| | | SA3310909142230 | 17.80 | 3.7851 | 4468.2 | E | 10/23/2009 |
| | | SA3310909157981 | 18.30 | 3.7822 | 4449.5 | F | 10/27/2009 |
| | | SA3310909158583 | 18.69 | 3.7817 | 4446.0 | F | 10/27/2009 |
| | | SA3310909155010 | 19.39 | 3.7813 | 4435.0 | F | 10/27/2009 |
| | | SA3310909154444 | 18.74 | 3.7817 | 4448.5 | F | 10/27/2009 |
| | 00S08PU110046032 | | 2.62 | 3.757 | | | |
| | | SA3310909142380 | 18.00 | 3.7848 | 4464.3 | F | 10/23/2009 |
| | | SA3310909142374 | 17.80 | 3.7852 | 4470.0 | E | 10/23/2009 |
| | | SA3310909142367 | 17.70 | 3.785 | 4469.9 | E | 10/23/2009 |
| | | SA3310909140836 | 17.40 | 3.7861 | 4469.5 | E | 10/23/2009 |
| | | SA3310909157298 | 18.44 | 3.7827 | 4423.5 | F | 10/27/2009 |
| | | SA3310909155038 | 18.44 | 3.7816 | 4450.0 | F | 10/27/2009 |
| | | SA3310909154660 | 19.10 | 3.7847 | 4447.5 | F | 10/27/2009 |
| | | SA3310909153971 | 19.37 | 3.7808 | 4435.0 | F | 10/27/2009 |
| | 00S08PU110046033 | | 2.66 | 3.756 | | | |
| | | SA3310909142377 | 17.90 | 3.7852 | 4469.1 | E | 10/23/2009 |
| | | SA3310909142378 | 17.70 | 3.7853 | 4471.7 | E | 10/23/2009 |
| | | SA3310909142383 | 18.20 | 3.7849 | 4470.7 | E | 10/23/2009 |
| | | SA3310909142219 | 17.70 | 3.7855 | 4469.3 | E | 10/23/2009 |
| | | SA3310909157333 | 16.46 | 3.7813 | 4427.0 | F | 10/27/2009 |
| | | SA3310909153982 | 18.88 | 3.7811 | 4444.0 | F | 10/27/2009 |
| | | SA3310909157792 | 19.13 | 3.7807 | 4447.4 | F | 10/27/2009 |
| | | SA3310909151019 | 19.36 | 3.7813 | 4450.5 | F | 10/27/2009 |
| | 00S08PU110046034 | | 2.71 | 3.756 | | | |
| | | SA3310909142359 | 17.80 | 3.7853 | 4469.6 | E | 10/23/2009 |
| | | SA3310909142370 | 17.80 | 3.7848 | 4464.6 | E | 10/23/2009 |
| | | SA3310909141430 | 18.10 | 3.7854 | 4453.3 | E | 10/23/2009 |
| | | SA3310909142228 | 17.80 | 3.7857 | 4463.5 | E | 10/23/2009 |
| | | SA3310909155045 | 19.21 | 3.7813 | 4445.0 | F | 10/27/2009 |
| | | SA3310909158971 | 18.64 | 3.7813 | 4433.0 | F | 10/27/2009 |
| | | SA3310909159236 | 19.05 | 3.7813 | 4447.0 | F | 10/27/2009 |
| | | SA3310909154694 | 19.81 | 3.7808 | 4445.5 | F | 10/27/2009 |
| | 00S08PU110046035 | | 2.71 | 3.757 | | | |
| | | SA3310909145191 | 17.70 | 3.7848 | 4459.1 | E | 10/23/2009 |
| | | SA3310909142234 | 17.90 | 3.7859 | 4463.9 | E | 10/23/2009 |
| | | SA3310909140828 | 17.90 | 3.786 | 4475.4 | E | 10/23/2009 |
| | | SA3310909140857 | 17.70 | 3.7858 | 4470.7 | E | 10/23/2009 |
| | | SA3310909158509 | 18.46 | 3.7809 | 4437.5 | F | 10/27/2009 |
| | | SA3310909157450 | 19.59 | 3.7815 | 4440.0 | F | 10/27/2009 |
| | | SA3310909155016 | 19.51 | 3.7807 | 4439.0 | F | 10/27/2009 |
| | | SA3310909158415 | 19.87 | 3.7815 | 4421.5 | F | 10/27/2009 |
| | 00S08PU110046036 | | 2.65 | 3.757 | | | |
| | | SA3310909144827 | 17.20 | 3.7849 | 4462.5 | E | 10/23/2009 |
| | | SA3310909145250 | 17.20 | 3.785 | 4456.0 | E | 10/23/2009 |
| | | SA3310909144886 | 17.50 | 3.7848 | 4458.5 | E | 10/23/2009 |
| | | SA3310909144822 | 17.30 | 3.7851 | 4459.2 | E | 10/23/2009 |
| | | SA3310909144677 | 19.70 | 3.7848 | 4434.9 | F | 10/23/2009 |
| | | SA3310909144507 | 19.40 | 3.7836 | 4438.0 | F | 10/23/2009 |
| | | SA3310909143795 | 19.70 | 3.785 | 4441.9 | F | 10/23/2009 |
| | | SA3310909144082 | 18.40 | 3.7838 | 4435.6 | F | 10/23/2009 |

US 8,483,886 B2

LARGE SCALE BATTERY SYSTEMS AND METHOD OF ASSEMBLY

INCORPORATION BY REFERENCE

This application claims the benefit of U.S. Provisional Application No. 61/238,882, filed on Sep. 1, 2009. The entire teachings of the above applications are incorporated herein by reference.

BACKGROUND OF THE INVENTION

Large scale battery systems are used as power storage devices for a variety of electric and hybrid electric vehicles. A few examples of vehicles that can be driven with electric or hybrid power are automobiles, boats, and trolley cars. These battery systems typically range in capacity from 10 kWh up to 100 kWh with nominal overall battery voltage ratings from 44.4 Vdc to 444 Vdc.

The most common approach to building large scale battery systems is to connect a number of individual high capacity battery cells together in series and parallel to achieve the desired system voltage and capacity. Each battery system may be assembled from tens to hundreds of individual battery cells. As consequence of the cell manufacturing process, any group of cells may exhibit varying distribution of at least two key parameters: internal impedance and charge holding capacity. The variation in both impedance and capacity within a group of manufactured cells can present a challenge in the manufacture of large scale battery systems, as parallel and series cell combinations within the system experience variations in impedance and capacity. Variation in impedance and capacity within the system directly affects overall battery system characteristics including the following: capacity, energy storage efficiency, cycle lifetime, thermal energy loss, internal temperature uniformity, cost of balancing electronics, and cost of heat removal (cooling) system.

SUMMARY OF THE INVENTION

The summary that follows details some of the embodiments included in this disclosure. The information is proffered to provide a fundamental level of comprehension of aspects of the present invention. The details are general in nature and are not proposed to offer paramount aspects of the embodiment. The only intention of the information detailed below is to give simplified examples of the disclosure and to introduce the more detailed description. One skilled in the art would understand that there are other embodiments, modifications, variations, and the like included with the scope of the claims and description.

An example embodiment of the present invention includes a method of identifying components used in the manufacture or assembly of a large scale battery. The method comprises attaching an identification designation to each of plural cells and plural blocks of cells included within the large scale battery. In addition, maintaining a database of the identification designations and associated parameters for the cells and blocks as well as selecting cells and blocks based on the associated parameters. The associated parameters may include capacities or internal resistances of the cells and blocks. Further, a pseudo-random number generator may be used to select cells and blocks for placement within the large scale battery. The pseudo-random number generator may select cells based on a normal distribution of cells available for placement within the large scale battery.

This method may be further comprised of attaching identification designations to each of plural modules of blocks included within the large scale battery and updating the database with the identification designations and associated parameters for the modules. The associated parameters may include capacities or internal resistances of the modules. The pseudo-random number generator may also be used to select modules for placement within the large scale battery.

Another example embodiment of the present invention includes a battery system and corresponding method of selecting cells for construction of a battery system. The method may be comprised of measuring capacity of battery cells and associating, in a database, each battery cell with its respective capacity measurement. Also, a statistical distribution may be calculated based on the capacity of measured battery cells and battery cells may be selected from across the statistical distribution for placement in the battery system. The selected battery cells may then be placed in parallel within the battery system. The battery cells may be selected to result in capacity of the battery system tending toward a mean of the statistical distribution. The battery cell capacities may be within a range of 4000 mAh to 4500 mAh or 4420 mAh to 4480 mAh. Additionally, the battery cells may be selected at random from particular segments (known as a "bin" to one skilled in the art) along the statistical distribution. If battery cells within a particular segment of the statistical distribution are depleted, battery cells may be selected from a neighboring segment that is closer to a mean of the statistical distribution.

A further embodiment of the present invention includes a battery system. The battery system may be comprised of a plurality of electrically coupled blocks of battery cells, including parallel connected battery cells within each block, and capacity of the battery cells in each block following a statistical distribution of a population of the battery cells from which the battery cells are selected. The battery cells may be selected to result in capacity of the battery system tending toward a mean of the statistical distribution.

Another example embodiment of the present invention includes a battery system and corresponding method of selecting cells for a battery system. The method may be comprised of measuring internal resistance for components of the battery system, maintaining a database that includes the internal resistance measurements, and placing cells in the battery system based on the internal resistance measurements. Placing cells may include placing cells having a low internal resistance measurement in areas of high internal resistance contributed from other components of the battery system relative to the battery terminals. Placing cells may also include placing cells having a high internal resistance measurement in areas of low internal resistance contributed from other components of the battery system relative to battery terminals. In cases where a battery terminal is externally contacted at more than one location, resulting in more than one path of current flow to/from the battery terminal, cells having high impedance are placed closer to the terminal contacting locations, and cells having lower internal resistance are placed father away from the terminal contacting locations. In addition, the database may include identification designations and associated parameters for the cells and components of the battery system. The associated parameters may include the internal resistances or capacities of the cells and components of the battery system.

A further example embodiment of the present invention includes a method of selecting desired capacities for components of a battery system. The method may be comprised of determining a temperature profile within the battery system, estimating a temperature dependent capacity of components of the battery system, and selecting components of the battery system using the temperature dependent capacities and temperature profile.

In addition, a reference block may be selected to establish an acceptable temperature for blocks within the battery system. Then, a temperature differential may be determined based on the reference block temperature and temperature of other blocks within the battery system. Desired capacity of blocks within the battery system may be determined based on the temperature dependent capacities and temperature differential. Further, blocks may be placed within the battery system based on the calculated desired capacity.

Another example embodiment of the present invention may include a battery system. The battery system may be comprised of a plurality of electrically coupled battery system components and battery system components having low capacity that are selected to be placed farthest away from a heat source. The battery components may include a plurality of electrically coupled blocks of battery cells or a plurality of electrically coupled modules of blocks of battery cells.

A further example embodiment of the present invention may include a method of identifying components of a large scale battery. The method may be comprised of attaching an identification designation to each of plural cells, blocks, and modules included within the large scale battery. A database may be maintained that includes the identification designations and associated parameters for the cells, blocks, and modules. The associated parameters may include capacities or internal resistances of the cells, blocks, and modules. A pseudo-random number generator may be used to select cells, blocks, and modules for placement within the large scale battery. The pseudo-random number generator may also select cells based on a normal distribution of cells available for placement within the large scale battery.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 7A is a chart depicting charge/discharge cycle data and the effect of two blocks with slight capacity mismatch compared to remaining blocks;

FIG. 7B illustrates a temperature gradient for a battery module in close proximity to an external heat source;

FIG. 7C is a physical placement diagram illustrating the placement of cells and blocks within a module in accordance with an example embodiment of the present invention;

FIG. 8 is a chart depicting typical module composition from block and cell identifiers including cell and block parameters for internal resistance and capacity in accordance with an example embodiment of the present invention.

DETAILED DESCRIPTION OF THE INVENTION

A description of example embodiments of the invention follows.

The teachings of all patents, published applications and references cited herein are incorporated by reference in their entirety.

Current large scale electric vehicle battery systems and other large scale battery systems do not provide a method of selecting cells for blocks and modules to achieve high levels of system performance, efficiency and lifetime while fully utilizing a manufactured cell inventory. Once cells have been selected, current large scale battery systems do not provide a method to place selected cells within the block to insure uniform effective cell impedance and even cell aging process while minimizing overall block capacity degradation due to cycling. Current large scale battery systems which experience a known average temperature gradient across blocks do not provide a method to place selected blocks to compensate for capacity derating due to some blocks operating at higher average temperatures compared to other blocks.

However, embodiments of the present invention include methods for manufacturing large scale battery systems, such as an electric vehicle, and corresponding battery systems. More specifically, the invention relates to an improved battery system and method of selecting and arranging manufactured cells for and within a battery system to improve overall system performance, lifetime and cell manufacturing inventory utilization.

Large scale battery systems are typically manufactured using a hierarchy of common sub-units to enable various capacity and voltage sizes, allow mechanical fit into different application enclosures, and simplify overall assembly, test, maintenance, and service processes. At the bottom of the large scale battery system manufacturing hierarchy is the single high capacity battery cell. A commercial example of the single high capacity battery cell is the Boston-Power Swing™ Li-ion battery cell.

In accordance with an example embodiment of the present invention, each high capacity battery cell (or cell) exhibits unique internal impedance and charge holding capacity which becomes known at the end of the cell manufacturing process. Once measured, these parameters are associated with their individual cell by a unique cell identifier. During the pack manufacturing process, cells are selected and arranged in groups to assemble the next largest sub-unit on the pack manufacturing hierarchy known as a block.

Figure 1C:
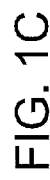
FIGS. 1A-1D are diagrams illustrating a block having eight cells connected in parallel in accordance with an example embodiment of the present invention.
Figure 1C:
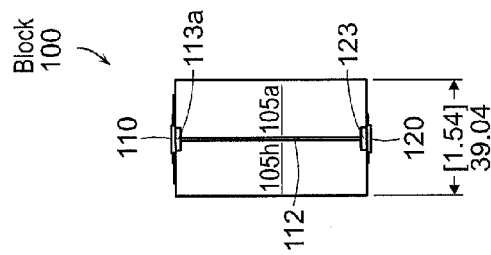
Figure 1A:
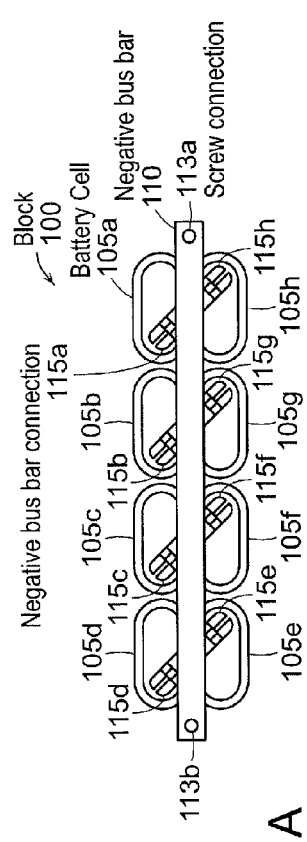
Figure 1B:
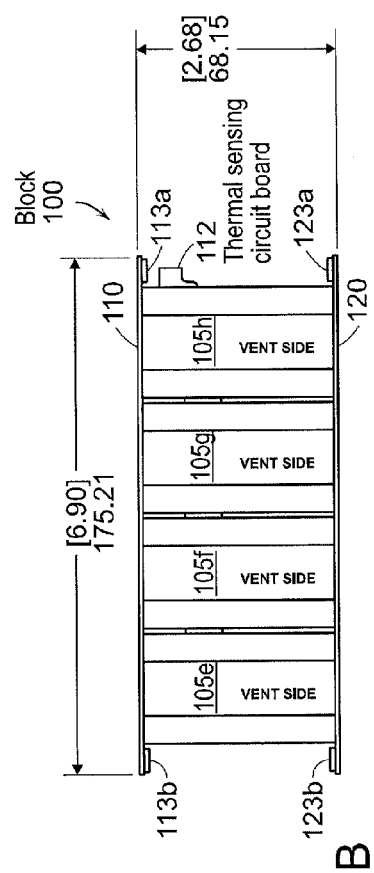
Figure 1D:
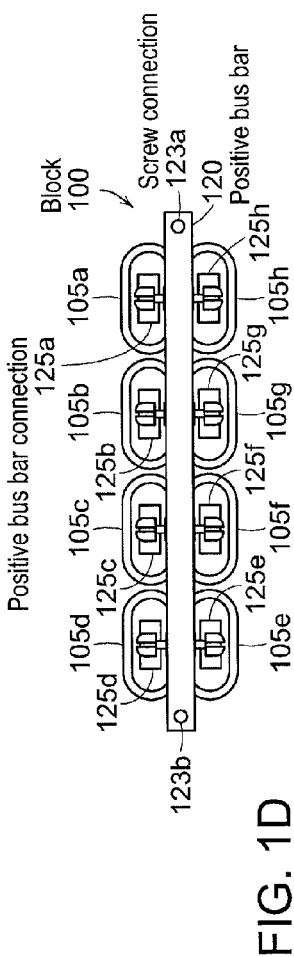

An example of a block 100 is shown in FIGS. 1A-1D, which illustrate an 8p1s grouping of single high capacity battery cells 105a-h with 130 Wh (Watt*hour) nominal capacity, and may include temperature sensing electronics 112. A block is therefore also called a single "virtual cell" because the block exhibits the same voltage as an individual cell and its capacity is the sum of the individual cell capacities. FIGS. 1A-1D illustrate top, side, front, and bottom views (respectively) of a block 100 in accordance with an example embodiment of the present invention. A block 100 may include multiple battery cells 105a-h, negative busbar 110, screw connections 113a-b to the negative busbar 110, negative busbar connections 115a-h for each battery cell 105a-h (respectively), positive busbar 120, screw connections 123a-b to the positive busbar, and positive busbar connections 125a-h for each battery cell 105a-h (respectively). As shown in FIG. 1A, the top (negative electrode) terminal of each cell 105a-h is electrically connected to a first copper busbar (represented as, negative busbar 110) using a negative busbar connection (or tab strip) 115a-h that is diagonally aligned across adjacent pairs of cells. The negative busbar connection 115a-h is welded to the top terminal of each cell 105a-h, and also welded to the negative busbar 110. Similarly, the bottom (positive electrode) terminal of each cell is electrically connected to a second copper busbar (represented as, positive busbar 120) using tab strips welded to each cell can bottom as shown in FIG. 1D. Electrical contact is made to the block using screw connectors 113a-b, 123a-b on either or both the left and right side of each busbar. A thermal sensing circuit board 112 may be positioned longitudinally between rows of four cells. As shown in FIG. 1B, a tab from the thermal sensor circuit board 112 may protrude from the right side of the block near the negative busbar 110 to allow electrical connection of the sensor board 112 to a battery management system controller (not shown).

Continuing to refer to FIGS. 1A through 1D, mechanically, cells 105a-h may be fixed in place by top tab strips 115a-h and bottom tab strips 125a-h, which hold the cells 105a-h in place as a block 100. A safety feature of the block 100 configuration is that the over-pressure vent side of the cell 105a-h may face outward on each side of the block 100, e.g., as shown in FIG. 1B, vent sides of cells 105e-h face outward on a side of the block 100. In this way, if an over-pressure event occurs in a cell 105a-h, the cell 105a-h will exhaust outward into a surrounding cooling cavity instead of inward into the adjacent cell.

Continuing to refer to FIGS. 1A through 1D, mechanically, the tab strips 115a-h, 125a-h and busbars 110, 120 may have a flexural compliance that enables the tab strips 115a-h, 125a-h and/or busbars 110, 120 to bend under static and dynamic mechanical loading, such as from shock or vibration of the block 100. The tab strip 115a-h, 125a-h welds have a weld strength that enables them to remain mechanically and electrically attached to their respective attachment points during static and dynamic loading conditions. The flexural compliance of the tab strips 115a-h, 125a-h and rigidity of the busbars 110, 120 may be chosen such that predominant modes of bending occur within the tab strips 115a-h, 125a-h, and not within the busbars 110, 120 or at the weld locations (represented as dimples on the tab strips 115a-h, 125a-h). In such a case, when the block 100 experiences mechanical shock or vibrations of frequency and magnitude common to the application environment, in bending, the flexural compliance of the tab strips 115a-h, 125a-h and rigidity of the busbars 110, 120 insures that the majority of mechanical stress occurs within the tab strips 115a-h, 125a-h and not at the weld attachment points. This mechanical configuration may allow for higher levels of static and dynamic loading to be tolerated by the block 100; thereby, lowering risk of mechanical fracture and cycling fatigue of the weld locations. Such fracture or cycling fatigue may cause an unsafe condition, such as an electrical disconnect or substantial increase in the interconnect impedance across the affected weld.

An example embodiment of the present invention includes a method of identifying components of a large scale battery. Each cell 105a-h of the block 100 of FIGS. 1A-1D may also include an identification designation on a surface of the cell 105a-h, such as the outward facing side of each cell 105a-h as shown by FIG. 1B. As used herein, an identification designator may include bar code, serial number, radio frequency identification device (RFID), or readable or scan-able code (either by human eye or mechanical sensing device). In addition, an identification designation may be attached (either detachably or permanently), embedded, or imprinted on to a surface of the cell 105a-h or block 100. Attaching the identification designation may occur during manufacturing, assembly, or production of the cell 105a-h, block 100 or module (which will be explained in further detail below regarding FIGS. 2A-2E). A database may be maintained that includes the identification designations and associated parameters (such as capacities and internal resistances) for the cells 105a-h and blocks 100. As such, cells 105a-h and blocks 100 may be selected based on the associated parameters. The database may also include information related to the manufacture of the cell 105a-h, block 100 or module, such as date/time stamp of completion of manufacturing steps, measurement of process parameters related to manufacturing (e.g., impedance, open circuit voltage, short circuit current, and high-pot test. The associated parameters may include capacities or internal resistances of the cells 105a-h and blocks 100. A pseudo-random number generator may be used to select cells 105a-h and blocks 100 for placement within the large scale battery, for example based on a normal distribution of cells 105a-h available for placement within the large scale battery.

Blocks are typically assembled in series with monitoring and balancing electronics (not shown) to form the next largest sub-unit on the battery system manufacturing hierarchy known as a module. FIGS. 2A-2E illustrate top, perspective, side, end, and exploded views (respectively) of an example embodiment of module 200 in accordance with an embodiment of the present invention.

Figure 2A:
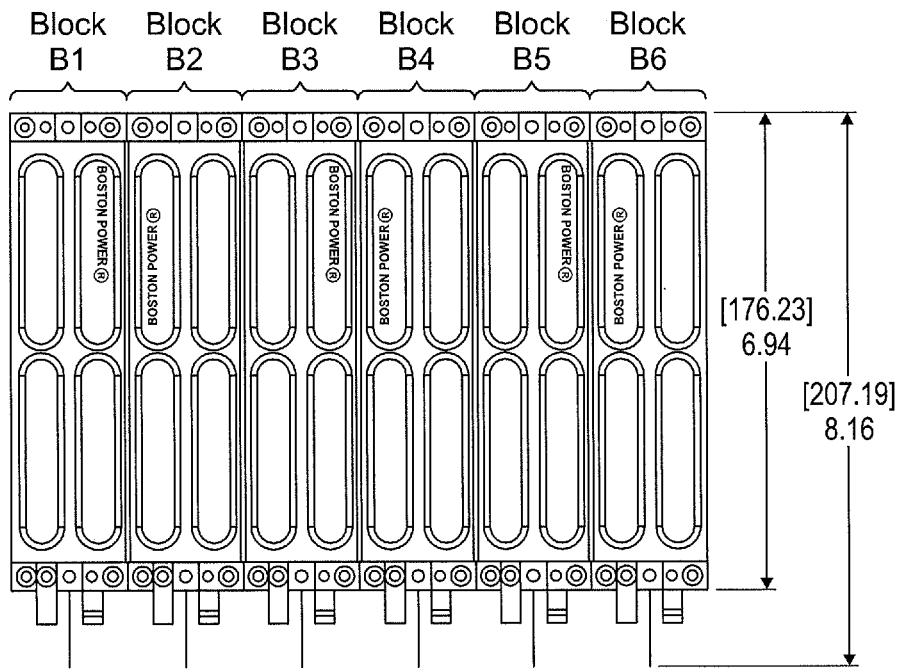
FIGS. 2A-2E are diagrams illustrating a module that may be employed in accordance with an example embodiment of the present invention.
Figure 2B:
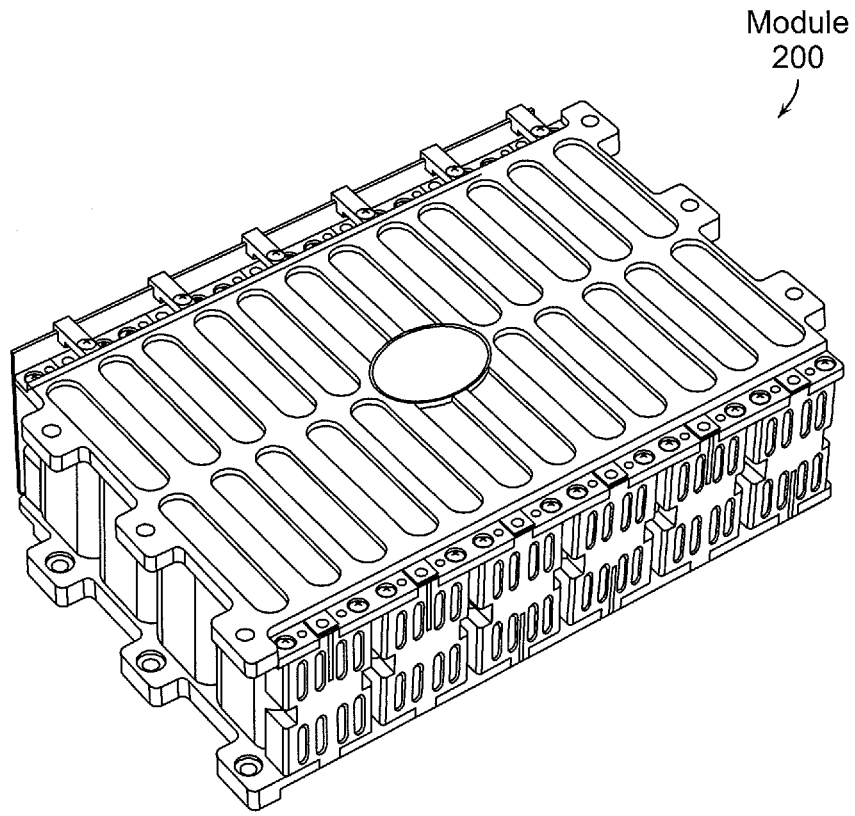
Figure 2C:
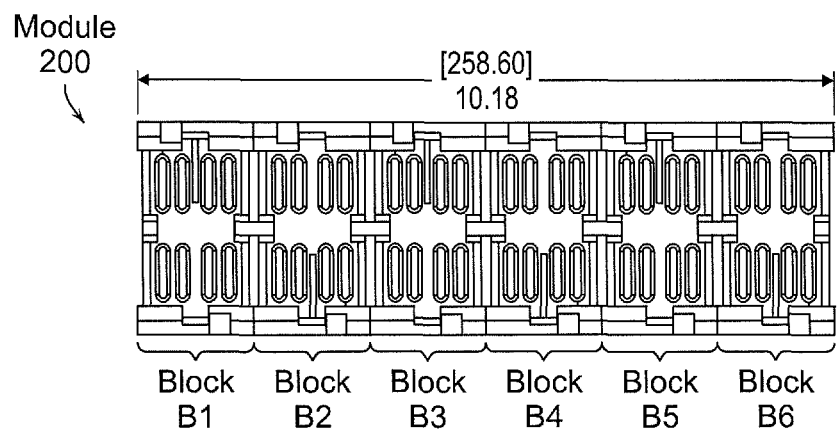
Figure 2D:
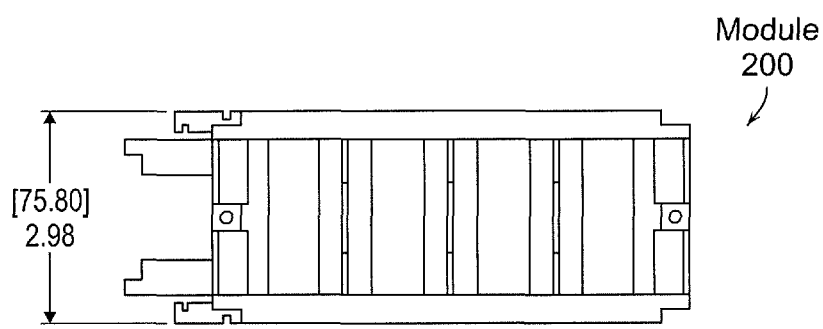
Figure 2E:
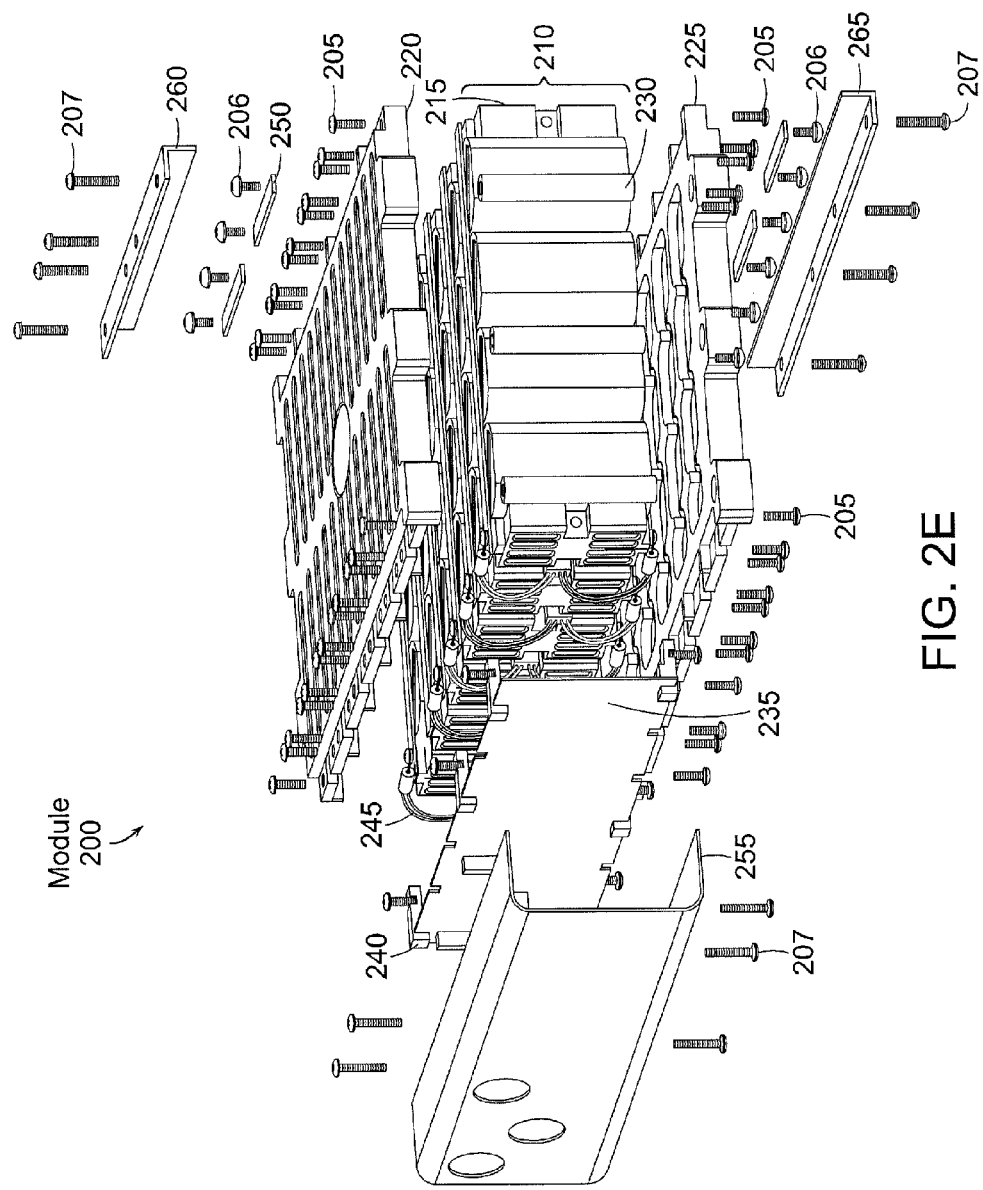

A module 200 may include 6 blocks (e.g., block 100 as illustrated in FIGS. 1A-1D) connected in series having 48 cells with 780 Wh nominal capacity. As shown in FIG. 2E, the module 200 may include screws 205-207, cell block assembly 210, cell block end piece 215, top cover and gap pad assembly 220, bottom cover and gap pad assembly 225, plastic spacer 230, back plane electronic circuit board assembly 235, circuit board retainer 240, cell block monitoring cable assembly 245, inter-cell connector 250, insulator (backplane circuit board) 255, insulator (terminal side top) 260, and insulator (terminal side bottom) 265. In FIG. 2A, the blocks B1-B6 may be arranged lengthwise side-by-side with terminals for each block protruding at the top and bottom of the module 200. In this example, six blocks B1-B6 are connected electrically in series by connected alternating busbar terminals, shown at the top of FIG. 2A. In this configuration, the bottom busbar terminals may be left unconnected. The leftmost and right-most bottom busbar terminals form the positive and negative terminals for the entire module 200. As shown by FIG. 2B, the module 200 may be held mechanically intact using molded non-conducting plastic plates on the two largest outside faces. Molded grooves match the contour of the cell blocks at the top and bottom to maintain the desired inter-block spacing. Retaining screws pass from the top to bottom plates to hold plates and entire assembly together. Inter-block cavities may serve as air cooling channels. An electronic printed circuit board backplane 235 may be attached to the unconnected terminals side of the module 200.

Battery management control electronics (not shown) to monitor individual block voltages and thermal sensor boards (e.g., thermal sensing circuit board 112 of FIG. 1B) may be included on the backplane. A module 200 may also include an identification designation.

In accordance with an example embodiment of the present invention, identification designations may be attached to each of plural modules 200 of blocks (e.g., block 100 of FIGS. 1A-1D) included within the large scale battery. Accordingly, a database may be updated with the identification designations and associated parameters for the modules and a pseudo-random number generator may be used to select modules 200 for placement within the large scale battery.

Figure 3:
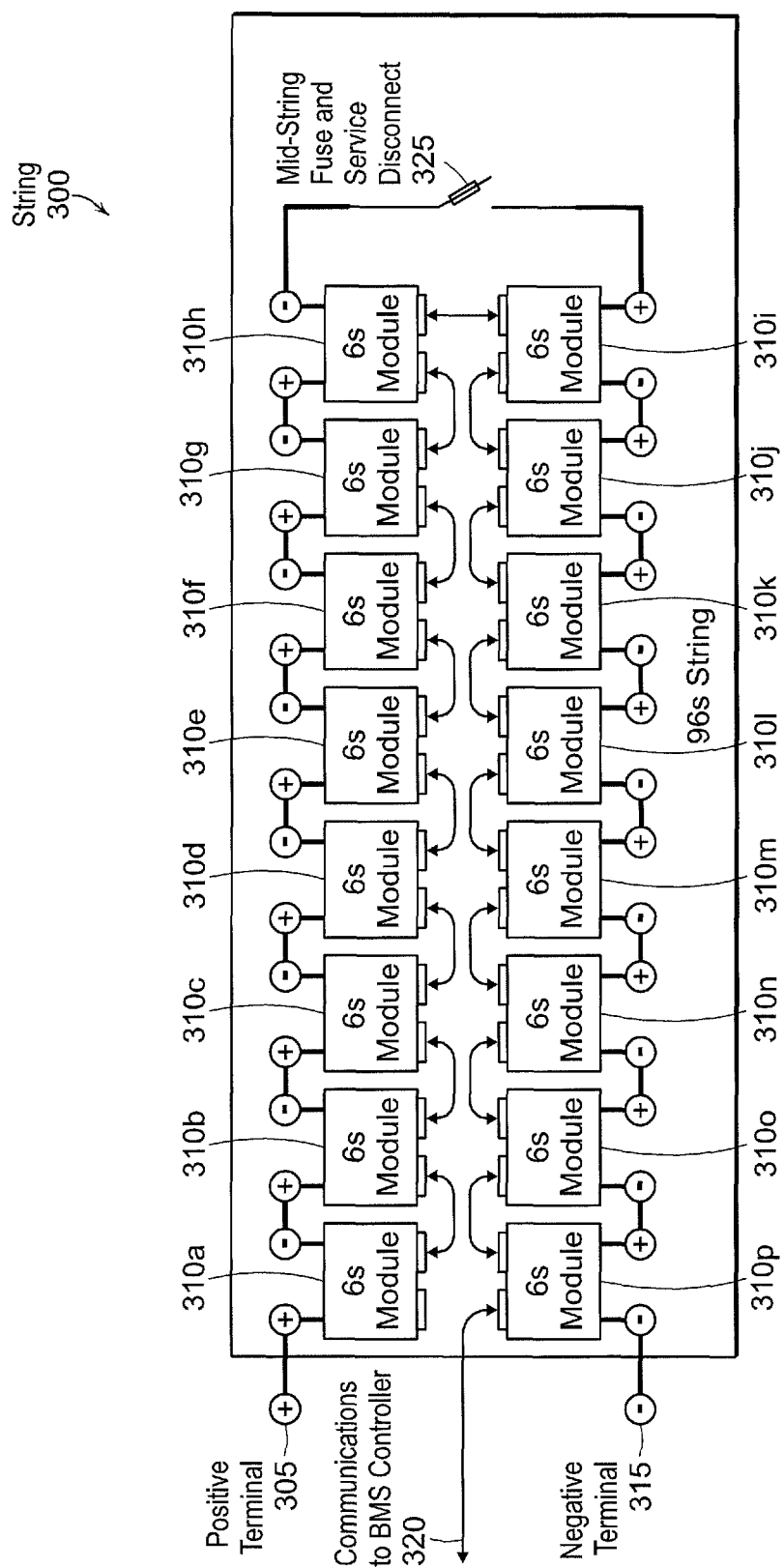
FIG. 3 is a connection diagram illustrating a string having sixteen modules connected in series in accordance with an example embodiment of the present invention.

Two or more modules may be connected (e.g., in series) to form a string. FIG. 3 is a connection diagram illustrating a string 300 having sixteen modules 310a-p connected in series in accordance with an example embodiment of the present invention. The string 300 may be comprised of a positive terminal 305, battery modules 310a-p (e.g., module 200 of FIGS. 2A-2E), negative terminal 315, communications path to the battery manage system (BMS) controller (not shown) 320, and mid-string fuse and service disconnect 325. Each battery module 310a-p may include six blocks connected in series, represented in FIG. 3 as "6s Module". The string 300 may be connected to the electronics of the pack (not shown) via the positive terminal 305, negative terminal 315, and communications path to the BMS controller 320. The BMS controller (not shown) may be connected to the modules to monitor each plurality of blocks or plurality of cells contained therein. In addition, the electronics of the pack may be used to control the charging and discharging of the battery system. Each string 300 may include a mid-string fuse and service disconnect 325 for safety purposes.

Figure 4:
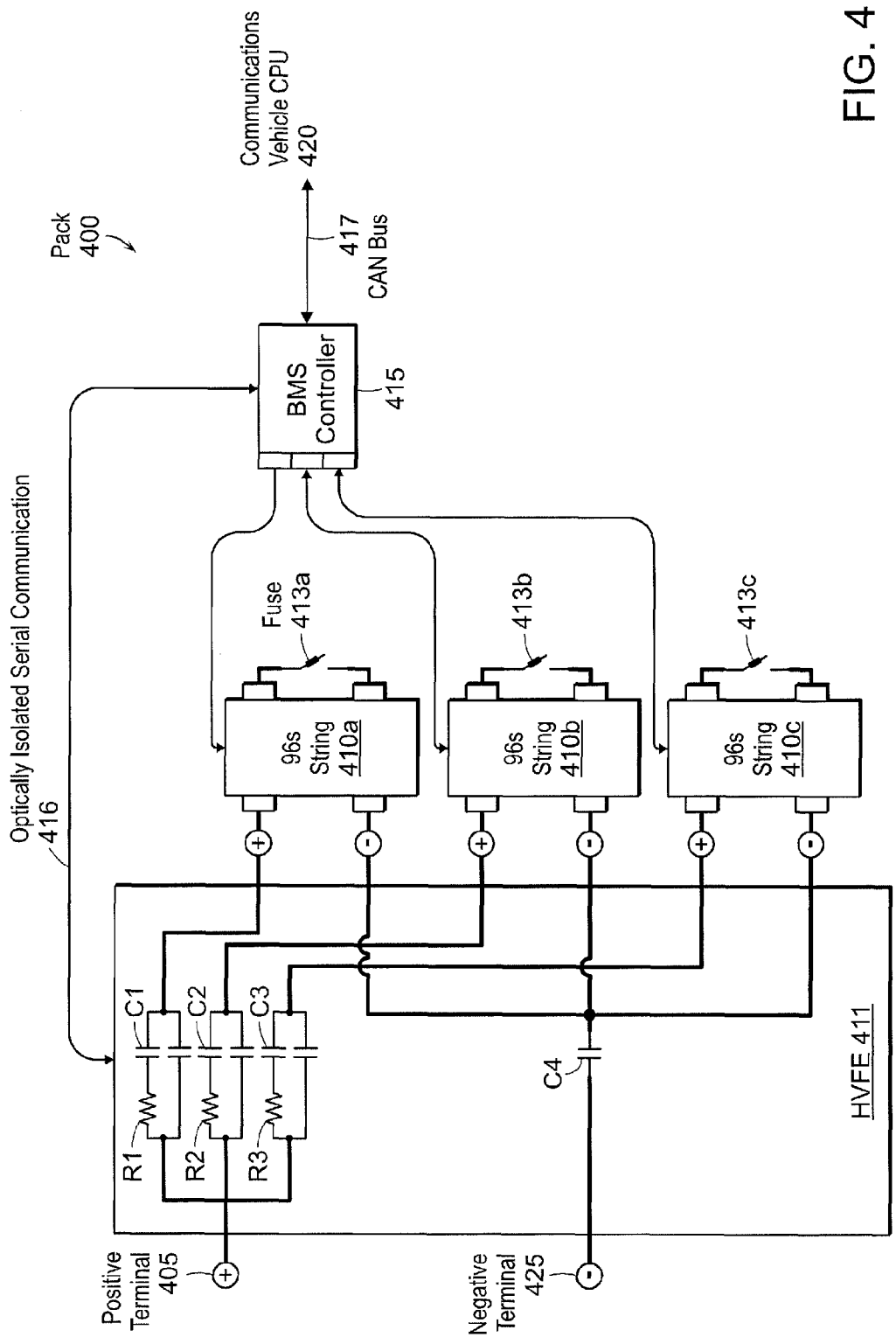
FIG. 4 is a connection diagram illustrating a large scale battery pack having three strings connected in parallel in accordance with an example embodiment of the present invention.

Two or more strings may be connected (e.g., series or parallel) to form a battery pack. FIG. 4 is a connection diagram illustrating a large scale battery pack 400 for a vehicle having three strings 410a-c connected in parallel in accordance with an example embodiment of the present invention. The pack 400 may be comprised of a positive terminal 405, resistors R1-R3, capacitors C1-C4, strings 410a-c (e.g., string 300 of FIG. 3), high voltage front end (HVFE) 411, fuses 413a-c (e.g., mid-string fuse and service disconnect 325 of FIG. 3), BMS controller 415, CAN Bus 417, communications vehicle CPU 420. The strings 410a-c may be combined with a BMS controller 415 (e.g., as shown in FIG. 3) and a HVFE 411. The HVFE 411 may provide electromechanically actuated contactors to connect/disconnect the entire pack 400 from the application (e.g., electric vehicle) main power bus. In addition, the HVFE 411 may have diagnostic capabilities such as insulation failure fault sensing capabilities. The BMS controller 415 may be used to manage block, module, and string operation and safety controls. The BMS controller 415 may also be used to execute performance optimization algorithms. The BMS controller 415 may also serve as the communication interface for the pack 400 to devices outside of the pack 400 (e.g., BMS controller 415 communicates via the CAN bus 417 to the communication for the vehicle CPU 420). The BMS control 415 may communicate with a HVFE 411 via an optically isolated serial communication path 416.

During the cell manufacturing process, cells may be tested for impedance and capacity. Typically cells found to be within an acceptable range of impedance, such as the range from approximately 13 mOhm to approximately 22 mOhm, are then sorted into several bins according to their capacity. When cells are selected from the bins during assembly to form a block, one manufacturing consideration relates to the selection and placement of cells in a block (e.g., a fixed location in the block 100 of FIG. 1A-1D). For example, in small battery systems, such as 3s1p or 3s2p configurations found in a notebook computer, all cells in the pack are capacity "matched" or chosen from the same bin to provide a pack with very similar capacities. Cell capacity matching occurs because series elements have similar capacity and will as a result remain in closer state of charge (SOC) balance during operation of the pack. Therefore, the cell inventory may be fully utilized due to manufacturing each small pack by choosing cells from the same bin, and manufacturing small packs from all available bins.

However, as packs get larger, e.g., consisting of 10s or 100s of cells, it becomes more difficult to match the capacity of series elements (e.g., blocks) while fully utilizing the manufactured cell inventory. For example, in large battery systems, undesirable conditions may occur if all cells are selected from the same bin for each block as done for small battery systems, and if blocks that are chosen from different bins are combined to utilize cell inventory. Doing so may result in series elements (e.g., blocks) within a module that are not capacity "matched" which reduces overall module capacity, requires increased balancing, and adds related inefficiencies and costs.

Figure 5:
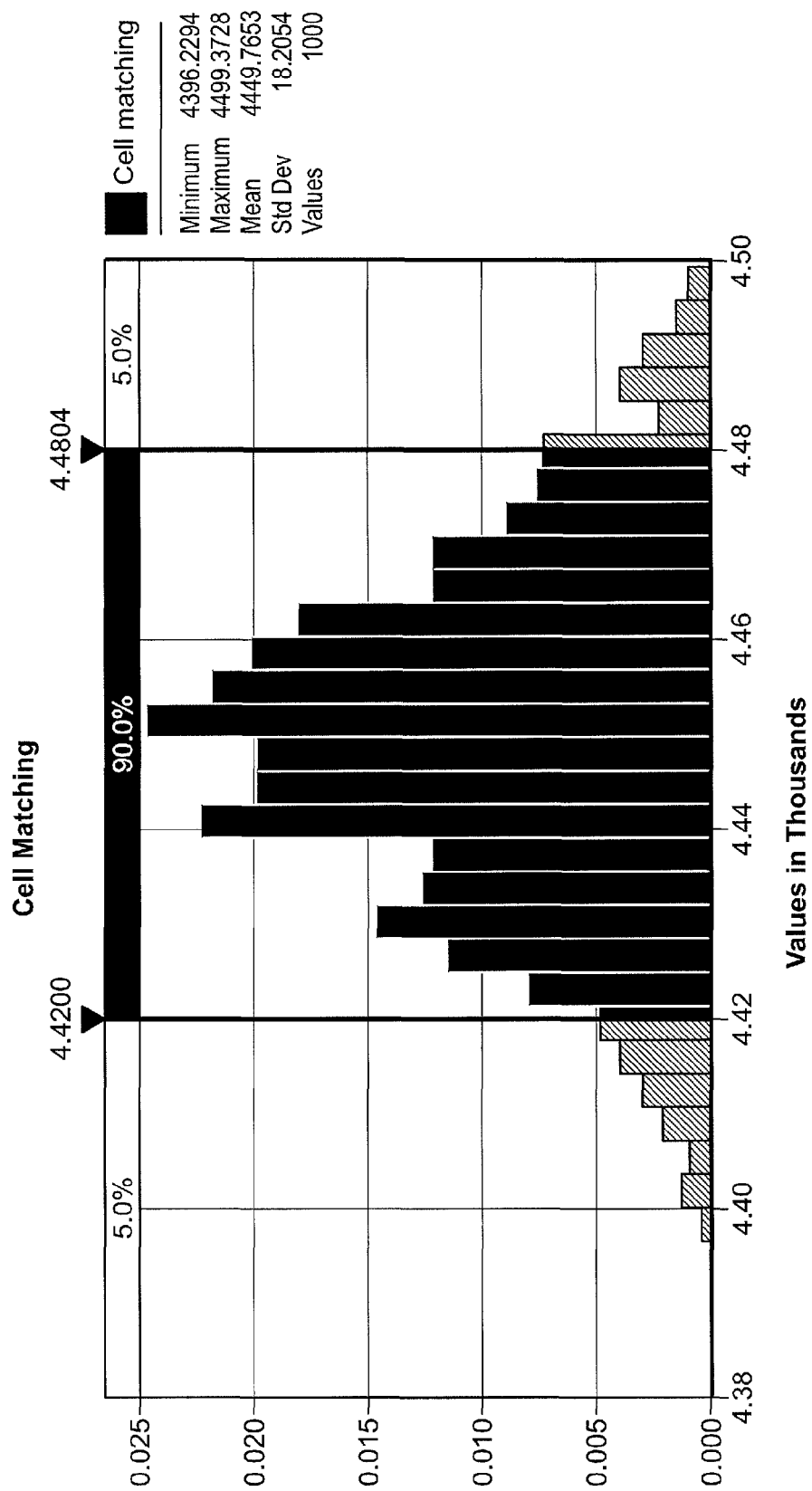
FIG. 5 is a chart illustrating a statistical model of manufactured cells distributed by capacity which may be used in an example embodiment of the present invention.

FIG. 5 shows statistical model data for a typical distribution of cells according to capacity. Another embodiment of the invention includes a method of selecting cells for construction of a battery system from a group of capacity-range sorting bins (represented as bars in the graph) in a manufactured cell distribution such as the one illustrated by FIG. 5. As used herein, the term "bin" is a pre-defined range of cell capacities that correspond to manufactured cells with capacities that are included by the particular pre-defined range. Each bar shown in the figure may be designated as a single bin. Alternatively, groups of adjacent bars may be designated to form fewer single bins.

In accordance with this example embodiment of the present invention, capacity of battery cells may be measured and each battery cell may then be associated with its respective capacity measurement in a database. Next, a statistical distribution of the battery cells may be calculated. By selecting cells at random from each bin of the distribution, or selecting cells substantially distributed across all capacity-range sorting bins, and then grouping the selected cells into a block, the resulting blocks will show better capacity matching with less variation between blocks. Cell capacities are known to be manufactured in a normal distribution displaying a shape similar to the model in FIG. 5. In accordance with an example embodiment of the present invention, cells may be chosen across the distribution and placed in parallel in the same block. Within a block, lower capacity cells may compensate for higher capacity cells and the capacity of the resulting blocks will tend toward the statistical mean of the normal distribution. This selection method is contrary to the method used in selecting cells for small packs, such as 2p3s notebook computer configurations, where cells are selected from the same bin to maintain very closely matched capacity between all cells in the pack. In addition, the cell selection made in accordance with an example embodiment of the present invention allows for cells to be taken from all bins so that the bins are depleted in a more uniform manner. This allows a manufacturer to more fully utilize the available manufacturing inventory.

As such, in accordance with an example embodiment of the present invention, a battery system may be comprised of a plurality of electrically coupled blocks of battery cells, including parallel connected battery cells within each block. Capacity of the battery cells in each block may follow a statistical distribution of a population of the battery cells from which the battery cells are selected. The battery cells may also be selected to result in capacity of the battery system tending toward a mean of the statistical distribution.

Continuing to refer to FIG. 5, assume that the distribution represents a real manufactured population of cells whose capacities fall in the approximately normal distribution and that acceptable cell capacities lie between the 4420 mAh (5%) and 4480 mAh (95%) demarcations. The mean capacity is approximately 4449 mAh. The bounds of the range and number of bins may vary depending on the manufacturing process, for example typical manufacturing range of 4420 mAh to 4480 mAh for battery cells with nominal capacity of 4400 mAh. Statistical boundaries may be used to group the cell population, such as 5% of all manufactured cells may have 4420mAh and below and 95% of all manufactured cells are 4480 mAh and below. Future anticipated ranges may be distributed around the nominal capacity of the particular cell product. Future ranges may be clustered around 4400 mAh, 4600 mAh, 4800 mAh, 5000 mAh, 5200 mAh, 5400 mAh, and higher as improved cell manufacturing technology improves the capacity. Bins are chosen, in this example four bins are chosen, to cover the range of acceptable cell capacities. Bin A includes cells having capacities ranging from approximately 4420 mAh to 4434 mAh, bin B includes cells having capacities ranging from approximately 4435 mAh to 4449 mAh, bin C includes cells having capacities ranging from approximately 4450 mAh to 4464 mAh, and bin D includes cells having capacities ranging from approximately 4465 mAh to 4480 mAh. For each block of eight cells, two cells are chosen at random from each of the four bins centered around the mean capacity. If all cells within a bin have been depleted, then cells may be selected from a neighboring bin closer to the mean capacity. The resulting blocks will tend to have more uniform capacities closer to the cell mean capacity.

Another manufacturing consideration relates to the placement of cells within a block. This particular manufacturing consideration has to do with the variations in cell impedance and variations in interconnection impedance due to welding tabs and busbars between possible cell placement locations within the block. If each cell in the block experiences different effective impedance to the block output terminals, and depending on its internal impedance, that cell will not cycle evenly with respect to neighboring cells. As a result, some cells in the block will age unevenly, experience capacity degradation sooner than their neighbors, and overall capacity degradation within the block occurs faster. As capacity of one block differs from other series blocks, several detrimental effects reduce capacity and efficiency of the overall module. If no charge balancing is used to equalize the block voltages, then the block with the lowest capacity will reach the lower cutoff voltage threshold first and cause the module to be depleted and need to be recharged. As such, the additional charge capacity in the remaining blocks may not be completely utilized and the module performance is determined by the weakest block. If, however, charge balancing is used to equalize the block voltages, blocks with degraded capacity will require higher balancing current over longer periods of time. As a result, overall energy efficiency of the pack will be lower. Balancing circuit components will need to have higher current rating at higher cost. If passive balancing is used through bleed resistors, then additional heat may be generated and, subsequently, removed from the module. Additional heat removal requires larger cooling system at higher cost.

Figure 6:
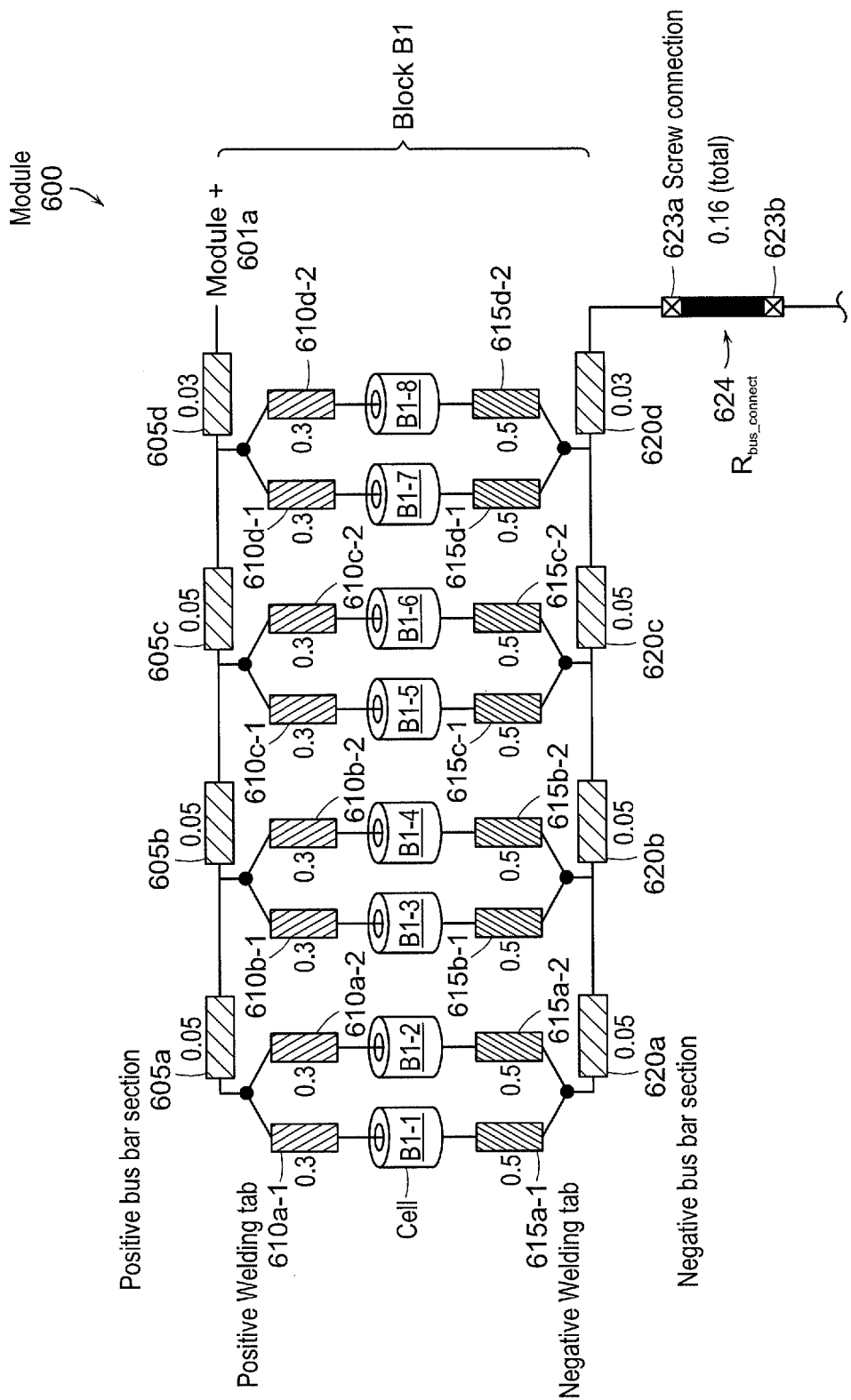
FIG. 6 is a diagram illustrating an internal direct current resistance model of two modules in accordance with an example embodiment of the present invention.
Figure 6:
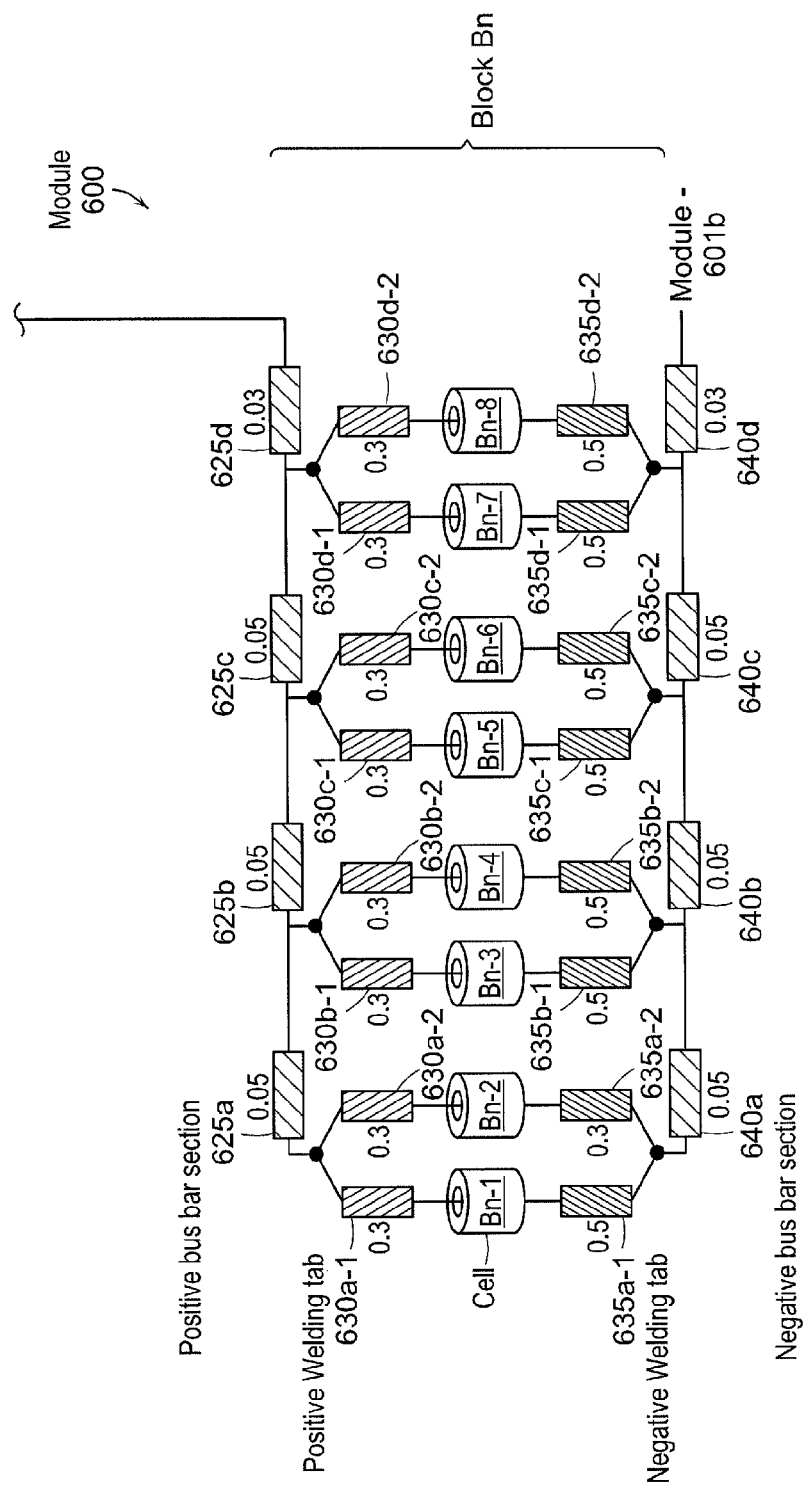

A further embodiment of the present invention is a method to place selected cells of a module into a block for uniform effective cell impedance and even cell aging while minimizing overall block capacity degradation due to cycling. In accordance with this method, internal resistance for components of the battery system may be measured and a database is maintained that includes the internal resistance measurements. Once cells have been selected for a block based on their internal resistance measurements, they may be placed into the block and then used to form a module. FIG. 6 illustrates an internal direct current (DC) resistance model for 8p cell blocks in a module 600. The module 600 includes several blocks, represented as Block B1 through Block Bn. The blocks may be connected to the electronics of the module 600 via the positive and negative terminals of the module, e.g., Block B1 is connected via its positive busbar sections 605a-d to the positive terminal 601a of the module 600 (represented as "Module +" in FIG. 6) and Block Bn is connected via the negative busbar sections 640a-d to the negative terminal 601b of the module 600 (represented as "Module —" in FIG. 6). The blocks may also be connected to one another via their respective screw connections, e.g., screw connection 623a of block 1 603a is connected via the $R_{bus\_connect}$ 624 to the screw connection 623b of Block B2 (not shown).

Continuing to refer to FIG. 6, positive and negative welding tabs, busbar sections, bus connect, and connection screws contribute additional resistance, typically at milliohm levels. In addition, each battery cell has its own internal resistance (IR) contributions to the block impedance. For example, Block B1 includes positive busbar sections 605a-d, positive welding tabs 610a-1-610d-2, internal resistance of a cell (which are designated by their cell positions within the block, B1-1 through B1-8), negative welding tabs 615a-1-615d-2, negative busbar sections 620a-d, screw connection 623a, and $R_{bus\_connect}$ 624; Block Bn includes positive busbar sections 625a-d, positive welding tabs 630a-1-630d-2, internal resistance 633a-1-633d-2, negative welding tabs 635a-1-635d-2, negative busbar sections 640a-d, screw connection 623b, and $R_{bus}$ connect (not shown). Cells having a low internal resistance measurement may be placed in areas of high internal resistance contributed from other components of the battery system relative to battery terminals In addition, cells having a high internal resistance measurement may be placed in areas of low internal resistance contributed from other components of the battery system relative to battery terminals. In the block connection topology illustrated by FIG. 6, cells closer to the right side of the block experience lower series connection impedance to the block terminals. Conversely, cells closer to the left side of the block experience higher series connection impedance to the block terminals. Cells sharing the same bus locations experience the same series connection impedance to the block terminals. The additional series connection impedance experienced by leftward cells in the block is due to the additional busbar impedance to the block terminals. Note that in a different topology, block terminals may be accessed at another location, or at multiple locations on the same block. The current path or paths to block terminals and the amount of busbar traversal is a manufacturing consideration. A common different topology from that illustrated in FIG. 6 could involve externally contacting at more than one location, for example at two locations on both the right and left ends of the block similar to the one shown in FIG. 6. In such a topology where external connection is made in two locations to each single battery terminal, two paths of current flow to/from the battery terminal will exist. In such a case, cells having high impedance are placed closer to the terminal contacting locations, and cells having lower internal resistance are placed farther away from the terminal contacting locations. In a topology similar to FIG. 6, but contacted from both the left and right sides, then cells in the center of the block would experience additional interconnect impedance, and according to the present invention these cells should be placed from a set with lower internal impedance. Similarly, cells at the left and right ends of the terminal block should be placed from a set with higher internal impedance. Generally in a terminal block of different topology, cells with lower impedance should be placed farther away from all external contacting locations to the terminals, while cells with higher impedance should be placed closer to the external contacting locations to the terminals.

In accordance with another embodiment of the present invention, a battery system may be comprised of a plurality of electrically coupled blocks of plural battery cells, including parallel connected battery cells within each block. In each block, battery cells having a low internal resistance may be placed in areas of high internal resistance contributed from other components of the battery system relative to battery terminals. Additionally, battery cells having a high internal resistance may be placed in areas of low internal resistance contributed from other components of the battery system relative to battery terminals.

Figure 7C:
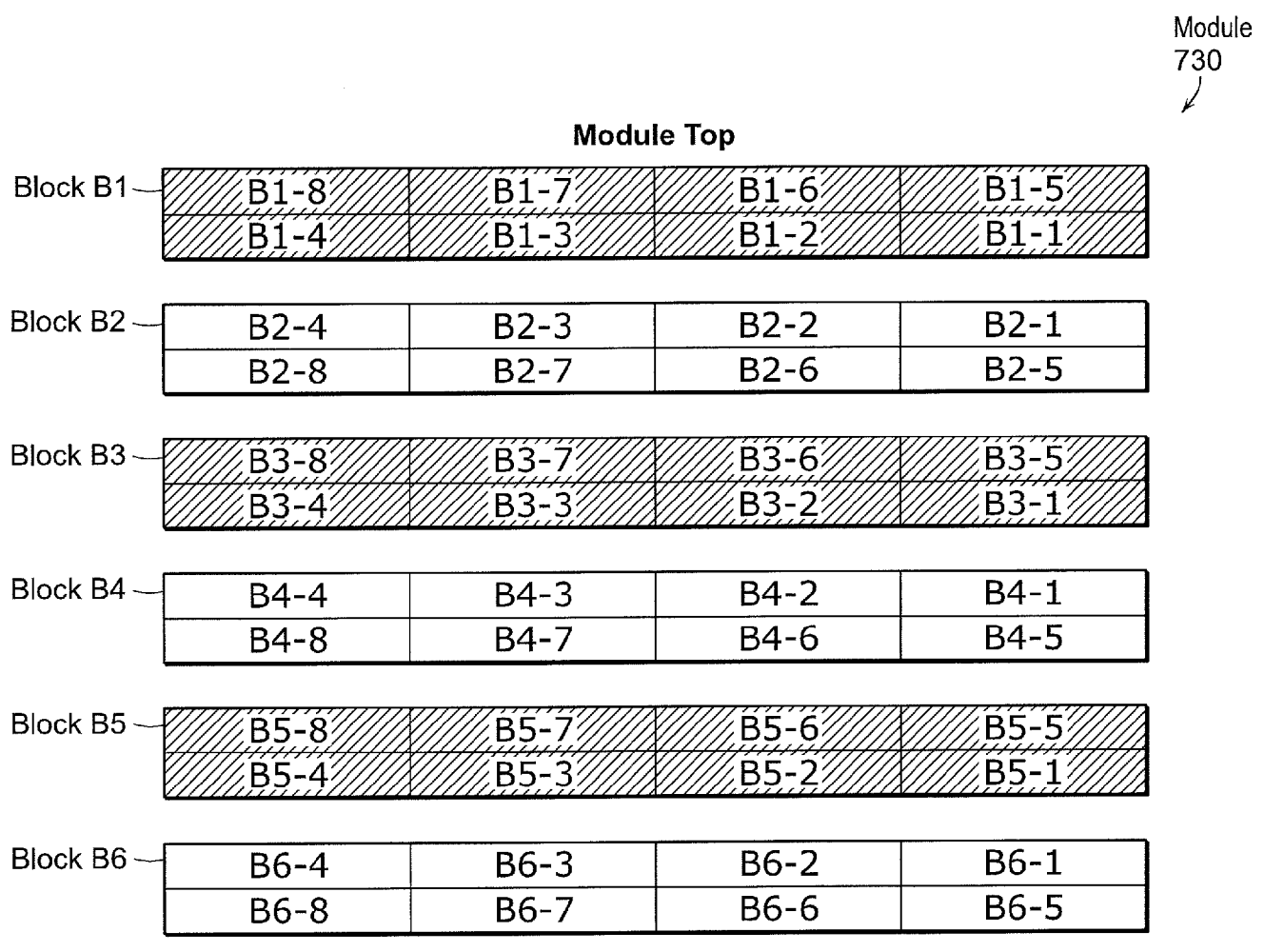

Another manufacturing consideration is for all cells within the same block to experience equivalent connection and internal resistance to the block terminals. Incorporating these manufacturing considerations allows for more even cell aging while minimizing overall block capacity degradation due to cycling. In accordance with an example embodiment of the present invention, selected block cells may be placed across the block according to their IR values. Referring to FIG. 6, cells with lower IR values are placed more leftward and cells with higher IR values are placed more rightward. For example, assume 8 cells are selected for a block B1 (cell selection will be discussed further below in reference to FIG. 8). Cells may then be sorted according to IR, e.g., a range from between 17.00 mOhm to 19.34 mOhm. FIG. 7C, which will be discussed further below, is a physical placement diagram that illustrates the placement of cells and blocks within a module in accordance with an example embodiment of the present invention. The two cells having the lowest IR may be placed in positions B1-4 and B1-8 as shown in FIG. 7C. The next highest two IR value cells may then be placed into positions B1-7 and B1-3, and so on until the two cells with the highest IR values are placed into positions B1-5 and B1-1. As such, the resulting block may have more closely matched cell impedances at the block terminals to even out cell aging and minimize overall block capacity degradation due to cycling.

Another manufacturing consideration is related to the placement of blocks within a module, which includes placement of cells within a block. This manufacturing consideration has to do with the module experiencing a known temperature gradient resulting from its operating environment that causes cell temperature in one location of the module to differ from cell temperature in another location of the module. If each cell in a block, or each block in a module, experiences different average temperature then that cell or module may experience different charge storage capacity. As a result, a cell in the block or a block in the module may age unevenly and experience capacity degradation sooner than its neighbors. In this scenario, overall capacity degradation within the module may occur faster. For example, FIG. 7A is a chart depicting charge/discharge cycle data and the effect of two blocks with a slight mismatch of capacity as compared to the remaining blocks. FIG. 7A shows experimental cycling data over 50 charge/discharge cycles with computed block capacity at cycle 1, cycle 25 and cycle 50. FIG. 7A shows that Blocks 2 through 5 are substantially balanced in capacity, while Blocks 1 and 6 have lower capacity. At cycle 50, the capacity of the mismatched blocks has continued to degrade below the capacity of the matched blocks.

A further embodiment of the present invention is a method for selecting and placing blocks based upon an expected temperature profile in a module. First, a temperature profile within the battery system may be determined. Such a profile may be the result of a battery module operating in close proximity to an external heat source as shown in FIG. 7B. FIG. 7B illustrates a battery module 710 that is subjected to a temperature from an external heat source (EHS) 705. The graph shows average temperatures for each block that may be used to determine block capacity de-ratings (e.g., T1 for Block B1, T2 for Block B2, T3 for Block B3, T4 for Block B4, T5 for Block B5, and T6 for Block B6). A temperature dependent capacity of the components of the battery system may then be estimated. Capacity is reduced for blocks farthest away from the EHS 705. For example, in FIG. 7B, Block B2 is 4° C. cooler than Block B1 and each subsequent block is 4° C. cooler as the distance between the block and the EHS 705 increases. Accordingly, a capacity de-rating factor of 100 mAh/° C. may be used to compute the required block capacities for the module 710. Components of the battery system may then be selected using the temperature dependent capacities and temperature profile.

In accordance with another example embodiment of the present invention, a battery system may be comprised of a plurality of electrically coupled battery system components. The battery system components having low capacity may be selected to be placed farthest away from a heat source. Additionally, the battery components may include a plurality of electrically coupled blocks of battery cells or a plurality of electrically coupled modules of blocks of battery cells.

According to another method in accordance with an example embodiment of the present invention a block, e.g., Block B1, may be used as the reference block to establish an acceptable temperature for the blocks within the system. Then, a temperature differential may be determined based on the temperature of Block B1 and temperatures of other blocks within the battery system. The capacity difference of Block B2 may be selected using the capacity-temperature de-rating factor multiplied by the temperature differential, $-4*100=-400$ mAh. Namely, Block B2 is selected with a capacity 400 mAh less than Block B1. Similarly, the capacities may be selected for Block B3, Block B4, Block B5, and Block B6. In this case, if Block B1 has a nominal capacity of approximately 10000 mAh, then Block B2 is selected with capacity of approximately 9600 mAh, Block B3 with capacity of approximately 9200 mAh, Block B4 with capacity of approximately 8800 mAh, Block B5 with capacity of approximately 8400 mAh, and Block B6 with capacity of approximately 8000 mAh. Then, the blocks may be placed within the battery system based on the calculated desired capacity.

In another example embodiment, an expected temperature profile may be measured or estimated for a module during operation. Operating temperatures are highly dependent on the application and whether the battery is charging, discharging, or open circuit. Typically, the temperature of a module may range a few degrees above room temperature, e.g., 30° C., to extreme module operating conditions between $-20°$ C. and 60° C. The average temperature difference between the first block and every additional block in the module may be computed using the temperature profile. A temperature-capacity rating factor (units of mAh per ° C.) may then be used to compute the additional capacity in mAh required for blocks at a higher expected average temperature difference from the first block. Similarly, the temperature-capacity rating factor may be used to reduce the capacity required for blocks at lower expected average temperature difference from the first block.

Continuing to refer to FIG. 7B, temperature may be measured using the temperature sensors located within each block (e.g., temperature sensing circuit board 112 of block 100 in FIG. 1B), or by using external temperature probes. The average temperature for each block is determined and a resulting profile such as the one shown in FIG. 7B is determined. In this instance, T1 may be 50° C. for Block B1; T2 may be 46° C. for Block B2; T3 may be 42° C. for Block B3, T4 may be 38° C. for Block B4, T5 may be 34° C. for Block B5, and T6 may be 30° C. for Block B6.

In addition, FIG. 7C depicts a module 730 with three blocks, Block B1, Block B3, Block B5, colored dark grey and three blocks, Block B2, Block B4, Block B6, colored light grey. Assume (i) that the light grey color blocks are, on average, 3° C. cooler than the dark grey color blocks and (ii) that a capacity derating factor of 100 mAh/° C. is used to compute the required block capacities for the module 730. Accordingly, Block B1 may be used as the reference block and Block B3 and Block B5 are expected to have no average temperature difference from Block B1. Block B2, Block B4, and Block B6 are expected to be 3 degrees cooler than Block B1. Using the capacity-temperature derating factor multiplied by the temperature differential, −3*100=−300 mAh, Block B2, Block B4, and Block B6 are selected to have 300 mAh lower capacity than Block B1. A module constructed from these blocks will have improved capacity and cycle lifetime.

Another embodiment of the present invention includes a method for identifying cells, blocks and modules using a unique identifier (ID) and associated parameters maintained in a database. During assembly of blocks and modules, it is advantageous to select and combine cells and blocks, respectively, which have certain parameter values or ranges of values. Such selection may be performed using a query of the ID database. For example, a query of blocks whose capacity falls within a certain range from a population of inventoried blocks allows selection of certain blocks for placement into a desired module. When these blocks are combined to form the module, the module may have a predicted desired characteristic such as, e.g., charge storage capacity, cycle life, or temperature performance. Additionally, selecting cells and blocks from a population of ID codes allows for fuller utilization of a manufactured inventory of cells and blocks. Inventories of cells and blocks may also be examined to determine available combinations of remaining cells and blocks to create blocks and modules, respectively, with preferred performance.

In accordance with this example embodiment of the present invention, during the manufacture of cells, blocks, and modules, each cell, block and module may be assigned a unique identifier (ID) code. Then, a cell, block or module may be tested to determine characteristic (or associated) parameters, such as charge storage capacity, open circuit voltage, and internal impedance. The unique ID and associated parameter may be assigned and maintained in a database for later retrieval. FIG. 8 is a chart depicting typical module composition for a module having module ID 46033. FIG. 8 depicts the composition of module ID 46033 from block and cell identifiers including cell and block parameters for internal resistance and capacity in accordance with an example embodiment of the present invention. Module 46033 includes six blocks, each with a unique block ID code, that are arranged in sequential order with the first block being listed at the top of the chart and the sixth block being listed at the bottom of the chart. Similarly, each of the six blocks is constructed of eight cells, where each cell also has a unique cell ID code. The order of ID codes associated with the block and module may additionally determine the physical placement of cells within a block and blocks within a module. For example, the cell, block and module configuration listed in FIG. 8 may be physically placed in accordance with a configuration depicted by FIG. 7C. The order of cells and blocks in FIG. 7C may be related to the order of cells and blocks stored in the database entries of FIG. 8. For example, the eight cells forming the first block of FIG. 8 may correspond to the cells of lowest potential B1-1, B1-2, . . . B1-8 of FIG. 7C. The ordering of these cells may be the same as listed in FIG. 8. The first cell listed under the first block is cell B1-1, followed by cell listing B1-2 through to the last cell in the first block which is B1-8 of FIG. 7C. The second block in the module, its first cell being listed next, is location B2-1, followed by cell listed for location B2-2 of FIG. 7C.

Additionally, selecting cells may be done using a pseudo-random number generator whose output lies on a normal distribution with the same arithmetic mean and standard deviation as the distribution of standard cells (such as, FIG. 5 which depicts a statistical model of manufactured cells distributed by capacity). A generated output value is placed in a virtual bin covering the same range as the selection bins. A "virtual bin" may be defined as non-physical collections of cell capacities generated by a computer. The term "virtual bin" is used because the member values are generated by a number generator, and do not correspond to actual manufactured cell capacity values. Periodically, the arithmetic mean and standard deviation of the manufactured cell distribution are measured and the pseudo-random number generator distribution is modified accordingly.

Figure 9:
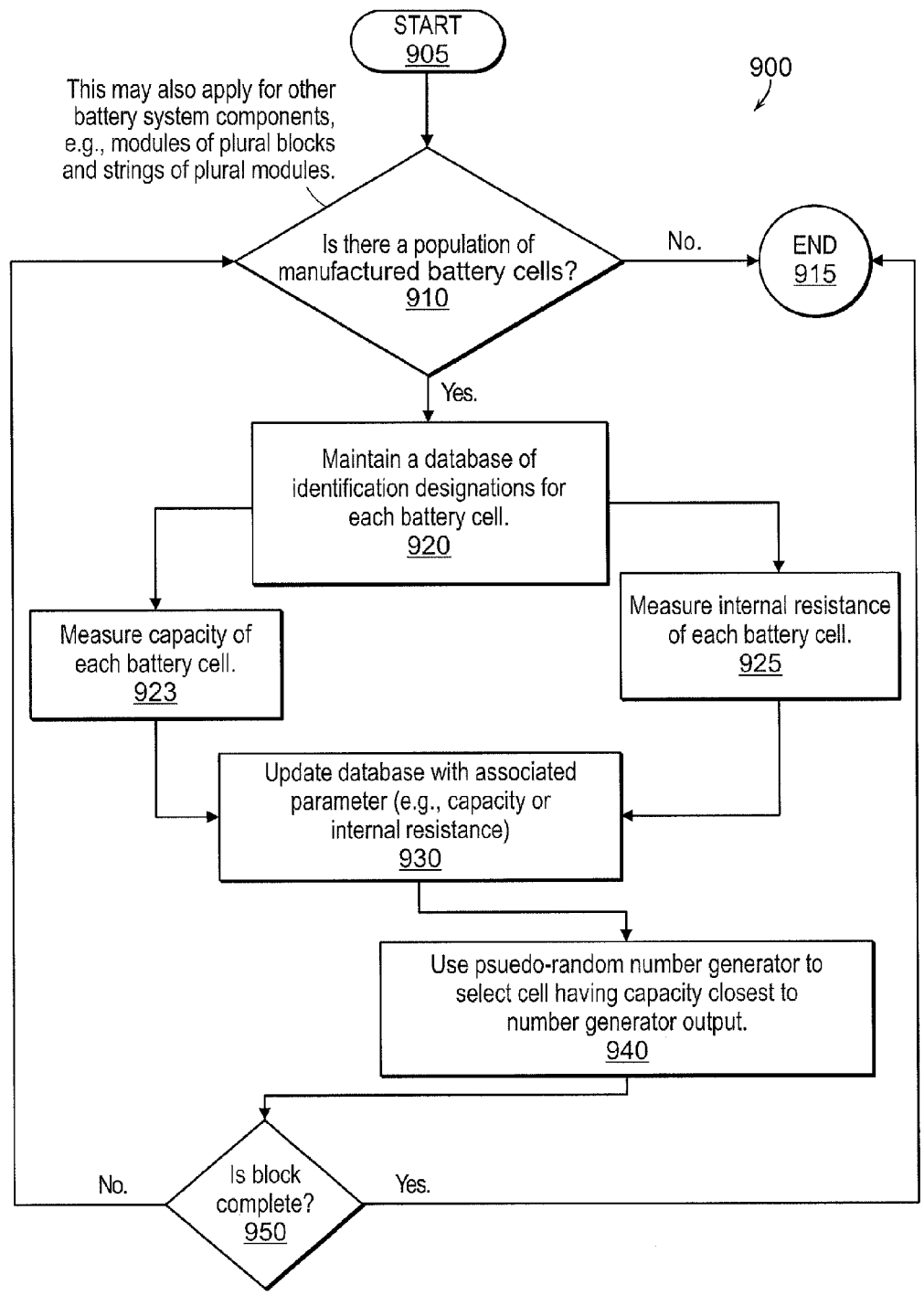
FIG. 9 is a flow diagram describing maintaining an inventory of population and selecting cells whose capacities fall within a measured normal distribution of the population.

Another example embodiment of the present invention includes maintaining an inventory pool (or population) of manufactured cells whose capacities fall within a measured normal distribution. FIG. 9 is a flow diagram 900 describing maintaining an inventory of population and selecting cells whose capacities fall within a measured normal distribution of the population.

The flow diagram 900 may begin 905 by establishing if a population of manufactured battery cells exists 910. If a population does not exist, then the method terminates 915. If there is a population, a database may be maintained 920, which includes identification designations for each battery cell. The capacity of each battery cell may be measured 923. In addition, internal resistance of each battery cell may be measured 925. The database may then be updated 930 with the associated parameter (e.g., capacity or internal resistance). A pseudo-random number generator may then be utilized 940 whose output lies on a normal distribution with the same arithmetic mean and standard deviation as the distribution of the inventory pool. The pseudo-random number generator provides an output by searching the inventory pool to find the cell identifier for a cell that has the capacity closest to the number generator output. Using groups of eight (or the number of parallel cells in a block), cells identified in this manner may be used to create blocks. If the block is complete 950, then the method terminates 915. If the block is not complete 950, then the method returns to assess the population of manufactured battery cells 910 (e.g., to determine if the population has been depleted, new cells have been manufactured, or if cells have expired). Example embodiments in accordance with this method may allow for more uniform depletion of the manufactured cell inventory. Therefore, utilization of the manufactured cell inventory is maintained at a high level. Resulting blocks may be more uniformly matched based on capacity, which tends to allow for less capacity variation between blocks and/or capacity tending toward the geometric mean of the cell distribution.

It should be understood that the flow diagram of FIG. 9 is merely an example. Other configurations, arrangements, additional blocks, fewer blocks, and so forth are possible in other embodiments. For example, it should be understood that this method may be used for battery system components, such as blocks of plural cells, modules of plural blocks, and strings of plural modules. For example, FIG. 8 details information for cells, blocks, and modules that may be used for the construction of a battery system. FIG. 9 describes maintaining an inventory of cells and selecting a block from that inventory for exemplary purposes.

While this invention has been particularly shown and described with references to example embodiments thereof, it will be understood by those skilled in the art that various changes in form and details may be made therein without departing from the scope of the invention encompassed by the appended claims. For example, while many of the illustrations relate to blocks containing eight cells, an example embodiment may be employed generally wherein the number and orientation of cells may change based on the required output for the large scale battery.

What is claimed is:

1. A method of constructing a large-scale battery that includes cells and blocks of cells, comprising the steps of:
    attaching an identification designation to each of plural cells for placement within the large-scale battery;
    measuring a parameter of the cells;
    associating, in a database, each cell with its respective parameter measurement;
    calculating a statistical distribution of the parameter of the measured battery cells;
    maintaining a database of the identification designations and associated parameters for the cells and blocks;
    selecting cells for each block from across the statistical distribution of the parameter; and
    placing selected cells in parallel within each block for placement in the large-scale battery according to the statistical distribution.

2. The method as claimed in claim 1, wherein the associated parameters include capacities of the cells.

3. The method as claimed in claim 1, wherein the associated parameters include internal resistances of the cells.

4. The method as claimed in claim 1, wherein selecting the cells for placement within each block of the large-scale battery includes use of a pseudo-random number generator.

5. The method as claimed in claim 4, wherein the pseudo-random number generator selects cells based on a normal distribution of cells available for placement within the large-scale battery.

6. The method as claimed in claim 1, further comprising the steps of:
    attaching identification designations to each of plural blocks included within the large-scale battery; and
    updating the database with the identification designations and associated parameters for the blocks.

7. The method as claimed in claim 6, wherein the associated parameters include capacities of the blocks.

8. The method as claimed in claim 6, wherein the associated parameters include internal resistances of the blocks.

9. The method as claimed in claim 6, wherein selecting the blocks for placement within the large-scale battery includes use of a pseudo-random number generator.

10. The method of claim 6, further including the step of selecting blocks of cells from across a statistical distribution of the parameter for placement within a large-scale battery, and placing the blocks in series within the large-scale battery according to the statistical distribution.

11. A method of selecting cells for construction of a large-scale battery system that includes cells and blocks of cells for placement within the large-scale battery, comprising the steps of:
    measuring at least one parameter of the cells;
    associating, in a database, each cell with its respective parameter measurement;
    calculating a statistical distribution of the parameter of the measured cells;
    selecting cells for each block from across the statistical distribution, of the parameter; and
    placing selected cells in parallel within each block for placement in the large-scale battery system according to the statistical distribution.

12. The method as claimed in claim 11, wherein the battery cells are selected to result in capacity of the large-scale battery system tending toward a mean of the statistical distribution.

13. The method as claimed in claim 11, wherein the battery cell capacities are within a range of 4000 mAh to 4500 mAh.

14. The method as claimed in claim 11, wherein the battery cell capacities are within a range of 4420 mAh to 4480 mAh.

15. The method as claimed in claim 11, wherein selecting battery cells includes selecting battery cells at random from particular segments along the statistical distribution.

16. The method as claimed in claim 11, further comprising, if battery cells within a particular segment of the statistical distribution are depleted, selecting battery cells from a neighboring segment that is closer to a mean of the statistical distribution.

17. A large-scale battery system that includes, a plurality of electrically-coupled blocks of cells and parallel-connected battery cells within each block, wherein
    a parameter of the battery cells in each block follows a statistical distribution of a population of the cells from which the cells are selected, the large-scale battery system being constructed by a method, including the steps of:
    measuring at least one parameter of battery cells for placement within the large-scale battery system;
    associating, in a database, each battery cell with its respective parameter measurement;
    calculating a statistical distribution of the parameter of measured battery cells;
    selecting battery cells, from across the statistical distribution, for placement in the large-scale battery system; and
    placing selected battery cells in parallel within the battery system according to the statistical distribution.

18. The battery system as claimed in claim 17, wherein the battery cells are selected to result in capacity of the battery system tending toward a mean of the statistical distribution.

19. The battery system as claimed in claim 17, wherein the battery cell capacities are within a range of 4000 mAh to 4500 mAh.

20. The battery system as claimed in claim 17, wherein the battery cell capacities are within a range of 4420 mAh to 4480 mAh.

21. The battery system as claimed in claim 17, wherein the block includes battery cells selected at random from particular segments along the statistical distribution.

22. The large-scale battery system of claim 17, wherein the cells selected result in internal resistance of the large-scale battery system tending toward a mean of the statistical distribution.

23. The method of claim 1, further including the step of attaching identification designations and associated parameters to each of plural blocks of the cells included in the large-scale battery.

24. The method of claim 23, wherein the associated parameters include capacities of the blocks.

25. The method of claim 23, wherein the associated parameters include internal resistances of the blocks.

26. The method of claim 23, further including the step of selecting blocks for placement within at least one module of the large-scale battery according to the statistical distribution.

27. The method of claim 26, wherein selecting blocks for placement with the large-scale battery includes using a pseudo-random number generator.

28. The method of claim 23, further including the step of attaching an identification designation to each of plural blocks of cells included in the large-scale battery.

29. The method of claim 28, further including the step of updating the database with the identification designations and associated parameters for the blocks.

30. The method of claim 29, wherein the parameter is at least one member of the group consisting of capacities of the cells and the internal resistances of the cells.

31. The method of claim 30, wherein the parameters include capacities of the cells and internal resistances of the cells.

32. The method of claim 30, wherein the parameter is the capacity of each of a plurality of the cells.

33. The method of claim 30, wherein the parameter is the internal resistance of each of a plurality of the cells.

* * * * *